(12) United States Patent
Kim et al.

(10) Patent No.: US 11,769,503 B2
(45) Date of Patent: Sep. 26, 2023

(54) ELECTRONIC DEVICE AND METHOD FOR PROCESSING USER UTTERANCE IN THE ELECTRONIC DEVICE

(71) Applicant: SAMSUNG ELECTRONICS CO., LTD., Suwon-si (KR)

(72) Inventors: Hyunjin Kim, Suwon-si (KR); Hyunduk Cho, Suwon-si (KR); Heeyoung Choo, Suwon-si (KR); Jaeyoung Lee, Suwon-si (KR); Jungkun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 308 days.

(21) Appl. No.: 17/341,836

(22) Filed: Jun. 8, 2021

(65) Prior Publication Data
US 2022/0215836 A1   Jul. 7, 2022

(30) Foreign Application Priority Data
Jan. 7, 2021   (KR) .................. 10-2021-0002173

(51) Int. Cl.
*G10L 15/22*   (2006.01)
*H04L 12/12*   (2006.01)
(Continued)

(52) U.S. Cl.
CPC .............. *G10L 15/22* (2013.01); *H04L 12/12* (2013.01); *G10L 15/00* (2013.01); *G10L 15/20* (2013.01); *G10L 2015/223* (2013.01)

(58) Field of Classification Search
CPC ......... G10L 15/22; G10L 15/00; G10L 15/20; G10L 2015/223
See application file for complete search history.

(56) References Cited

U.S. PATENT DOCUMENTS 9,043,211 B2 *   5/2015   Haiut .................... G06F 1/3265
                                                                704/251
9,368,105 B1 *   6/2016   Freed ...................... G10L 15/22
(Continued)

FOREIGN PATENT DOCUMENTS

JP   06-110835   4/1994
JP   08-146991   6/1996
(Continued)

OTHER PUBLICATIONS

International Search Report and Written Opinion dated Feb. 4, 2022 in corresponding International Application No. PCT/KR2021/015595.

*Primary Examiner* — Feng-Tzer Tzeng
(74) *Attorney, Agent, or Firm* — Nixon & Vanderhye, P.C.

(57) ABSTRACT

According to an embodiment, an electronic device comprises: a communication module comprising communication circuitry, a memory, and at least one processor. The memory stores instructions which, when executed, cause the at least one processor to control the electronic device to: transmit, to a first electronic device through the communication module, first response data obtained by processing a first speech input corresponding to a first utterance received from the first electronic device, identify a second electronic device including circuitry configured to detect a second utterance associated with the first response data within a designated time after the first utterance, transmit a wake-up signal to the second electronic device, receive, from the second electronic device, a speech input corresponding to an utterance obtained by a microphone turned on based on the wake-up signal, identify whether the received speech input corresponding to the utterance is a second speech input corresponding to the second utterance, obtain second response data obtained by processing the second speech input based (Continued)

on the first speech input and the first response data in response to identifying that the received speech input corresponding to the utterance is the second speech input corresponding to the second utterance, and transmit the second response data to at least one of the first electronic device or the second electronic device through the communication module.

20 Claims, 17 Drawing Sheets

(51) Int. Cl.
    *G10L 15/00*     (2013.01)
    *G10L 15/20*     (2006.01)

(56) References Cited

U.S. PATENT DOCUMENTS

| | | |
|---|---|---|
| 2005/0043956 A1 | 2/2005 | Aoyama et al. |
| 2017/0083285 A1 | 3/2017 | Meyers et al. |
| 2018/0033438 A1 | 2/2018 | Toma et al. |
| 2018/0096072 A1 | 4/2018 | He et al. |
| 2019/0095171 A1 | 3/2019 | Carson et al. |
| 2019/0138272 A1 | 5/2019 | Ahn |
| 2019/0172467 A1 | 6/2019 | Kim et al. |
| 2019/0341049 A1 | 11/2019 | Cheng et al. |
| 2020/0043497 A1 | 2/2020 | Hahm et al. |
| 2020/0135212 A1 | 4/2020 | Cho et al. |
| 2020/0193994 A1 | 6/2020 | Ahn et al. |
| 2022/0044670 A1 | 2/2022 | Shim et al. |

FOREIGN PATENT DOCUMENTS

| | | |
|---|---|---|
| JP | 2003-208196 | 7/2003 |
| JP | 2020-30494 | 2/2020 |
| KR | 10-2018-0012055 | 2/2018 |
| KR | 10-2018-0042376 | 4/2018 |
| KR | 10-2019-0051379 | 5/2019 |
| KR | 10-2020-0043642 | 4/2020 |
| KR | 10-2020-0047311 | 5/2020 |

\* cited by examiner

ELECTRONIC DEVICE AND METHOD FOR PROCESSING USER UTTERANCE IN THE ELECTRONIC DEVICE

CROSS-REFERENCE TO RELATED APPLICATION

This application is based on and claims priority under 35 U.S.C. § 119 to Korean Patent Application No. 10-2021-0002173, filed on Jan. 7, 2021, in the Korean Intellectual Property Office, the disclosure of which is incorporated by reference herein in its entirety.

BACKGROUND

Field

The disclosure relates to electronic devices, for example, to methods and devices for collecting and processing user utterances.

Description of Related Art

Portable digital communication devices have become a must-have item in the modern era. Customers desire to receive various high-quality services anytime, anywhere using their portable digital communication devices.

The speech recognition service is a service that provides customers with various content services corresponding to the user's speech received based on a speech recognition interface implemented on portable digital communication devices. In order to provide speech recognition services, portable digital communication devices are implemented with technologies that recognize and analyze human language (e.g., automatic speech recognition, natural language understanding, natural language generation, machine translation, dialogue system, question and answer, speech recognition/synthesis).

In order to provide high-quality speech recognition services to consumers, it is necessary to implement a technology that accurately identifies user intents from user speeches and a technology that provides appropriate content services corresponding to the identified user intents.

As artificial intelligence (AI) technology advances, there are under development electronic devices equipped with an intelligent agent that provides speech recognition services. An electronic device equipped with an intelligent agent (hereinafter, also referred to as an electronic device) may receive and process user utterances. The electronic device may receive a speech signal corresponding to the user's utterance through a microphone. When the distance between the electronic device and the user is large, the user's utterance may not be clearly received by the electronic device, which may cause speech recognition failure. For example, the user may move while speaking, and if the user's utterance is not received by the electronic device due to the movement of the user, the user may not receive the speech recognition service. Thus, the user may be needed to keep a speech recognizable distance from the electronic device to receive the speech recognition service, which may be annoying and inconvenient.

SUMMARY

Embodiments of the disclosure provide an electronic device capable of providing a speech recognition service by seamlessly acquiring the user's utterance even when the user utters while moving, and a method for processing user utterances on the electronic device.

Embodiments of the disclosure provide an electronic device capable of providing a speech recognition service even when the user moves while speaking, by, for example, obtaining the user's first utterance via a first electronic device and obtaining a second utterance, subsequent to the first utterance, via a second electronic device on the user's movement path, and a method for processing user utterances on the electronic device.

According to an example embodiment, an electronic device comprises: a communication module including circuitry, a memory, and at least one processor. The memory stores instructions that, when executed, cause the at least one processor to control the electronic device to: transmit, to a first electronic device through the communication module, first response data obtained by processing a first speech input corresponding to a first utterance received from the first electronic device, identify a second electronic device comprising circuitry configured to detect a second utterance associated with the first response data within a designated time after the first utterance, transmit a wake-up signal to the second electronic device, receive, from the second electronic device, a speech input corresponding to an utterance obtained by a turn-on of a microphone based on the wake-up signal, identify whether the received speech input corresponding to the user utterance is a second speech input corresponding to the second utterance, obtain second response data obtained by processing the second speech input based on the first speech input and the first response data in response to identifying that the received speech input corresponding to the utterance is the second speech input corresponding to the second utterance, and transmit the second response data to at least one of the first electronic device or the second electronic device through the communication module.

According to an example embodiment, a method for processing a user utterance by an electronic device comprises: transmitting, to a first electronic device through a communication module, first response data obtained by processing a first speech input corresponding to a first utterance received from the first electronic device, identifying a second electronic device configured to detect a second utterance associated with the first response data within a designated time after the first utterance, transmitting a wake-up signal to the second electronic device, receiving, from the second electronic device, a speech input corresponding to an utterance obtained by a turn-on of a microphone based on the wake-up signal, identifying whether the received speech input corresponding to the user utterance is a second speech input corresponding to the second utterance, obtaining second response data obtained by processing the second speech input based on the first speech input and the first response data in response to identifying that the received speech input corresponding to the user utterance is the second speech input corresponding to the second utterance, and transmitting the second response data to at least one of the first electronic device or the second electronic device through the communication module.

According to an example embodiment, there is provided a non-transitory computer readable storage medium storing instructions, the instructions, when executed by at least one processor cause the at least one processor to control an electronic device to perform at least one operation, the at least one operation comprising: transmitting, to a first electronic device through a communication module, first response data obtained by processing a first speech input corresponding to a first utterance received from the first electronic, identifying a second electronic device configured to detect a second utterance associated with the first response data within a designated time after the first utterance, transmitting a wake-up signal to the second electronic device, receiving, from the second electronic device, a speech input corresponding to an utterance obtained by a turn-on of a microphone based on the wake-up signal, identifying whether the received speech input corresponding to the user utterance is a second speech input corresponding to the second utterance, obtaining second response data obtained by processing the second speech input based on the first speech input and the first response data in response to identifying that the received speech input corresponding to the utterance is the second speech input corresponding to the second utterance, and transmitting the second response data to at least one of the first electronic device or the second electronic device through the communication module.

According to various example embodiments of the disclosure, it is possible to seamlessly obtain user utterances and provide a speech recognition service by obtaining and processing a user utterance and its subsequent utterance via a plurality of electronic devices on the user's movement path.

According to an example embodiment, it is possible to allow the user to receive a speech recognition service via a plurality of electronic devices even while on the move by obtaining the user's first utterance via a first electronic device and obtaining a second utterance, subsequent to the first utterance, via a second electronic device on the user's movement path, and a method for processing user utterances on the electronic device.

Effects of the disclosure are not limited to the foregoing, and other unmentioned effects would be apparent to one of ordinary skill in the art from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

The same or similar reference denotations may be used to refer to the same or similar elements throughout the specification and the drawings.

DETAILED DESCRIPTION

The terms as used herein are provided merely to describe various embodiments thereof, but not to limit the scope of other embodiments of the disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
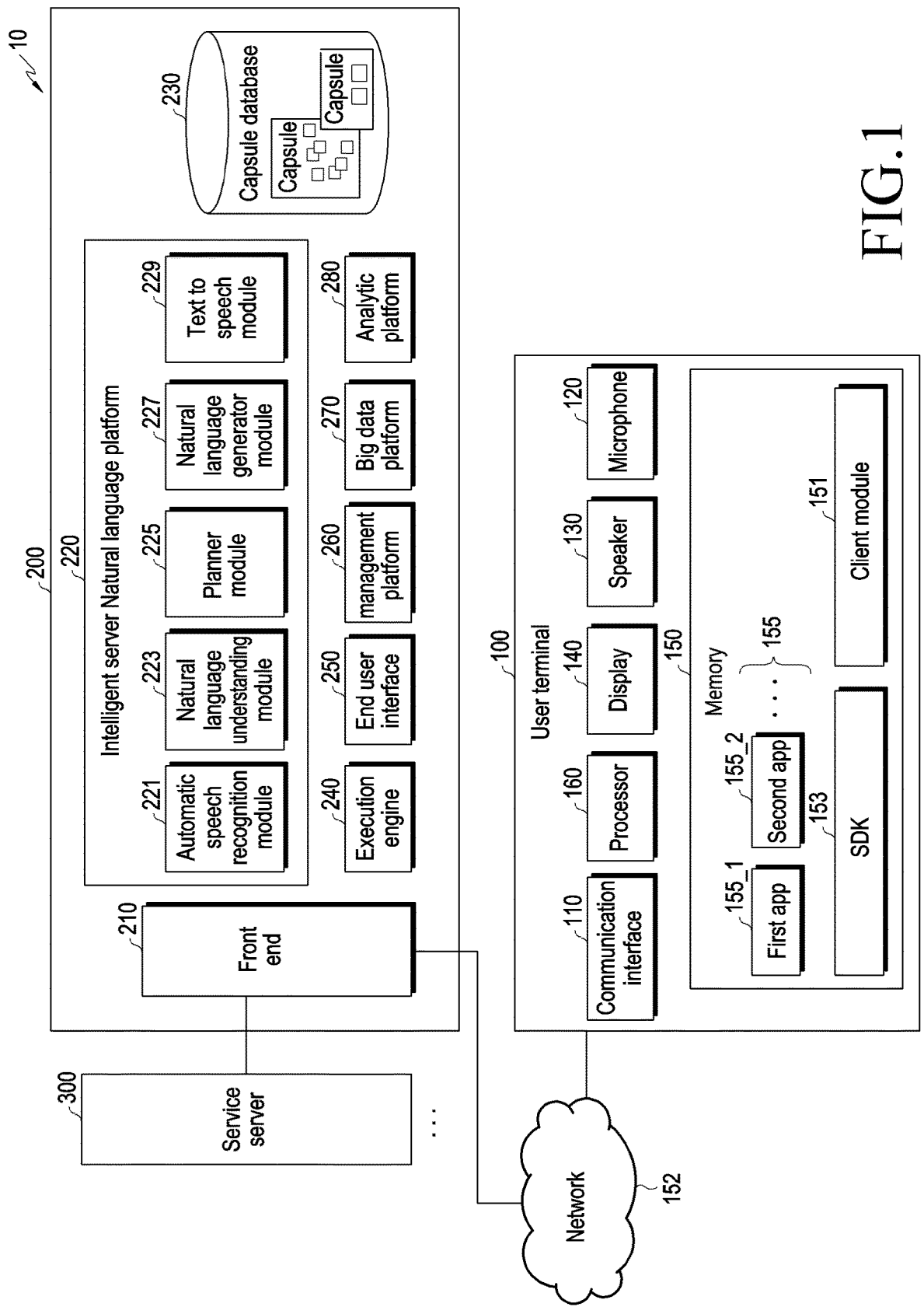
FIG. 1 is a block diagram illustrating an example integrated intelligence system according to various embodiments.

FIG. 1 is a block diagram illustrating an example integrated intelligence system according to various embodiments.

Referring to FIG. 1, according to an embodiment, an integrated intelligence system 10 may include a user terminal 100, an intelligent server 200, and a service server (e.g., service content provider) 300.

According to an embodiment, the user terminal 100 may be a terminal device (or electronic device) that may connect to the Internet, e.g., a mobile phone, smartphone, personal digital assistant (PDA), laptop computer, TV, home appliance, wearable device, head-mounted device (HMD), smart speaker, etc.

According to an embodiment, the user terminal 100 may include a communication interface (e.g., including communication circuitry) 110, a microphone 120, a speaker 130, a display 140, a memory 150, and/or a processor (e.g., including processing circuitry) 160. The above-enumerated components may be operatively or electrically connected with each other.

According to an embodiment, the communication interface 110 may include various communication circuitry and be configured to connect to, and transmit/receive data to/from, an external device. According to an embodiment, the microphone 120 may receive a sound (e.g., the user's utterance) and convert the sound into an electrical signal. According to an embodiment, the speaker 130 may output the electrical signal as a sound (e.g., speech). According to an embodiment, the display 140 may be configured to display images or videos. According to an embodiment, the display 140 may display a graphic user interface (GUI) of an app (or application program) that is executed.

According to an embodiment, the memory 150 may store various executable program elements including, for example, a client module 151, a software development kit (SDK) 153, and a plurality of apps 155_1, 155_2, etc. (which may simply be referred to hereinafter as element 155). The client module 151 and the SDK 153 may include a framework (or solution program) for performing general-purpose functions. The client module 151 or SDK 153 may include a framework for processing speech input.

According to an embodiment, the plurality of apps 155 may include programs for performing designated functions. According to an embodiment, the plurality of apps 155 may include a first app 155-1 and a second app 155-3. According to an embodiment, each of the plurality of apps may include a plurality of actions for performing the designated function. For example, the apps 155 may include an alarm app, a messaging app, and/or a scheduler app, etc. According to an embodiment, the plurality of apps 155 may be executed by the processor 160 to execute at least some of the plurality of operations.

According to an embodiment, the processor 160 may include various processing circuitry and control the overall operation of the user terminal 100. For example, the processor 160 may be electrically connected with the communication interface 110, microphone 120, speaker 130, and display 140 to perform designated operations.

According to an embodiment, the processor 160 may execute the program stored in the memory 150 to perform a designated function. For example, the processor 160 may execute at least one of the client module 151 or the SDK 153 to perform the following operations for processing speech input. The processor 160 may control the operation of the plurality of apps 155 via, e.g., the SDK 153. The following operations described as operations of the client module 151 or SDK 153 may be operations according to the execution of the processor 160.

According to an embodiment, the client module 151 may include various executable program elements configured to receive a speech input. For example, the client module 151 may receive a speech signal corresponding to the user's utterance detected via the microphone 120. According to an embodiment, the client module 151 may transmit a speech input (e.g., speech data) corresponding to the received speech signal to the intelligent server 200. The client module 151 may transmit state information about the user terminal 100 along with the speech input to the intelligent server 200. The state information may be, e.g., app execution state information.

According to an embodiment, the client module 151 may receive a result corresponding to the speech input. For example, when the intelligent server 200 may produce the result corresponding to the received speech input, the client module 151 may receive the result (e.g., response data) corresponding to the received speech input. The client module 151 may display the received result on the display 140.

According to an embodiment, the client module 151 may receive a plan corresponding to the speech input. The client module 151 may display the results of execution of the plurality of operations of the app according to the plan on the display 140. The client module 151 may display, e.g., the results of execution of the plurality of operations on the display. As another example, the user terminal 100 may display only some results of execution of the plurality of operations (e.g., the result of the last operation) on the display.

According to an embodiment, the client module 151 may receive a request for obtaining information necessary to produce the result corresponding to the speech input from the intelligent server 200. According to an embodiment, the client module 151 may transmit the necessary information to the intelligent server 200 in response to the request.

According to an embodiment, the client module 151 may transmit information resultant from executing the plurality of operations according to the plan to the intelligent server 200. The intelligent server 200 may identify that the speech input has been properly processed using the result information.

According to an embodiment, the client module 151 may include a speech recognition module. According to an embodiment, the client module 151 may recognize the speech input to perform a limited function via the speech recognition module. For example, the client module 151 may perform an intelligent app to process the speech input to perform organic operations via a designated input (e.g., Wake up!).

According to an embodiment, the intelligent server 200 may receive information related to a speech input from the user terminal 100 through the network 152. According to an embodiment, the intelligent server 200 may convert the data related to the speech input into text data. According to an embodiment, the intelligent server 200 may generate a plan for performing the task corresponding to the user speech input based on the text data.

According to an embodiment, the plan may be generated by an artificial intelligence (AI) system. The AI system may be a rule-based system or a neural network-based system (e.g., feedforward neural network (FNN)), recurrent neutral network (RNN), or the like). Or, the AI system may be a combination thereof or a system different therefrom. According to an embodiment, the plan may be selected from a set of pre-defined plans or created in real-time in response to a user request. For example, the AI system may select at least one plan from among a plurality of pre-defined plans.

According to an embodiment, the intelligent server 200 may transmit the result according to the generated plan to the user terminal 100 or transmit the generated plan to the user terminal 100. According to an embodiment, the user terminal 100 may display the result according to the plan on the display. According to an embodiment, the user terminal 100 may display the result of execution of the operation according to the plan on the display.

According to an embodiment, the intelligent server 200 may include a front end 210, a natural language platform (e.g., including processing circuitry and/or executable program elements) 220, a capsule database (DB) 230, an execution engine (e.g., including processing circuitry and/or executable program elements) 240, an end user interface (e.g., including interface circuitry) 250, a management platform (e.g., including processing circuitry and/or executable program elements) 260, a big data platform (e.g., including processing circuitry and/or executable program elements) 270, and/or an analytic platform (e.g., including processing circuitry and/or executable program elements) 280.

According to an embodiment, the front end 210 may include various circuitry and receive a speech input from the user terminal 100. The front end 210 may transmit a response corresponding to the speech input.

According to an embodiment, the natural language platform 220 may include various processing circuitry and/or executable program elements, including, for example, an automatic speech recognition module (ASR module) 221, a natural language understanding module (NLU module) 223, a planner module 225, a natural language generator module (NLG module) 227, and/or a text to speech module (TTS module) 229.

According to an embodiment, the ASR module 221 may include various processing circuitry and/or executable program elements and convert the user input received from the user terminal 100 into text data. According to an embodiment, the NLU module 223 may include various processing circuitry and/or executable program elements and grasp the user's intent using the text data of the speech input. For example, the NLU module 223 may perform syntactic analysis or semantic analysis to grasp the user's intent. According to an embodiment, the NLU module 223 may grasp the meaning of a word extracted from the speech input using linguistic features (e.g., syntactic elements) of morphemes or phrases, match the grasped meaning of the word to the intent, and determine the user's intent.

According to an embodiment, the planner module 225 may include various processing circuitry and/or executable program elements and generate a plan using the parameter and intent determined by the NLU module 223. According to an embodiment, the planner module 225 may determine a plurality of domains necessary to perform a task based on the determined intent. The planner module 225 may determine the plurality of operations included in the plurality of domains determined based on the intent. According to an embodiment, the planner module 225 may determine parameters necessary to execute the plurality of determined operations or resultant values output by execution of the plurality of operations. The parameters and/or resultant values may be defined in a designated format (or class) of concept. Thus, the plan may include the plurality of operations determined by the user's intent and a plurality of concepts. The planner module 225 may stepwise (or hierarchically) determine the relationship between the plurality of operations and plurality of concepts. For example, the planner module 225 may determine the order of execution of the plurality of operations determined based on the user's intent based on the plurality of concepts. In other words, the planner module 225 may determine the order of execution of the plurality of operations based on the result output by execution of the plurality of operations and the parameters necessary to execute the plurality of operations. Thus, the planner module 225 may generate a plan that contains association information (e.g., ontology) between the plurality of operations and the plurality of concepts. A plan may be generated using information stored in the capsule DB 230 that stores a set of concept-operation relationships.

According to an embodiment, the NLG module 227 may convert designated information into a text type. The text-type information may be in the form of a natural language utterance. According to an embodiment of the disclosure, the TTS module 229 may include various processing circuitry and/or executable program elements and convert text information into speech information.

According to an embodiment, all or some of the functions of the natural language platform 220 may also be implemented in the user terminal 100.

The capsule DB 230 may store information about the relationship between the plurality of concepts and operations corresponding to the plurality of domains. According to an embodiment, the capsule may include a plurality of concept objects (or concept information) and a plurality of action objects (or action information) included in the plan. According to an embodiment, the capsule DB 230 may store a plurality of capsules in the form of a concept action network (CAN). According to an embodiment, the plurality of capsules may be stored in a function registry included in the capsule DB 230.

According to an embodiment, the capsule DB 230 may include a strategy registry storing strategy information necessary to determine the plan corresponding to the speech input. The strategy information may include reference information for determining one plan if there are a plurality of plans corresponding to the speech input. According to an embodiment, the capsule DB 230 may include a follow up registry storing follow up information to propose a subsequent action to the user in a designated context. The subsequent action may include, e.g., a subsequent utterance. According to an embodiment, the capsule DB 230 may include a layout registry storing layout information about the information output via the user terminal 100. According to an embodiment, the capsule DB 230 may include a vocabulary registry storing vocabulary information included in capsule information. According to an embodiment, the capsule DB 230 may include a dialog registry storing dialog (or interaction) information with the user. The capsule DB 230 may update the stored object via a developer tool. The developer tool may include a function editor for updating, e.g., the action object or concept object. The developer tool may include a vocabulary editor for updating the vocabulary. The developer tool may include a strategy editor to generate and register a strategy to determine a plan. The developer tool may include a dialog editor to generate a dialog with the user. The developer tool may include a follow up editor capable of activating a subsequent goal and editing a subsequent utterance to provide a hint. The subsequent goal may be determined based on the current goal, the user's preference, or environmental conditions. According to an embodiment, the capsule DB 230 may also be implemented in the user terminal 100.

According to an embodiment, the execution engine 240 may include various processing circuitry and/or executable program elements and produce a result using the generated plan. The end user interface 250 may include various circuitry and transmit the produced result to the user terminal 100. Thus, the user terminal 100 may receive the result and provide the received result to the user. According to an embodiment, the management platform 260 may include various processing circuitry and/or executable program elements and manage information used in the intelligent server 200. According to an embodiment, the big data platform 270 may include various processing circuitry and/or executable program elements and gather user data. According to an embodiment, the analytic platform 280 may include various processing circuitry and/or executable program elements and manage the quality of service (QoS) of the intelligent server 200. For example, the analytic platform 280 may manage the components and processing speed (or efficiency) of the intelligent server 200.

According to an embodiment, the service server 300 may provide the user terminal 100 with a designated service (e.g., a shopping list service, a restaurant search service, an alarm service, or a service using speech recognition). According to an embodiment, the service server 300 may be a server operated by a third party. According to an embodiment, the service server 300 may provide information for generating the plan corresponding to the received speech input to the intelligent server 200. The provided information may be stored in the capsule DB 230. According to an embodiment, the service server 300 may provide result information according to the plan to the intelligent server 200.

According to an embodiment of the disclosure, in the integrated intelligence system 10, the user terminal 100 may provide various intelligent services to the user in response to user inputs. The user inputs may include, e.g., inputs using physical buttons, touch inputs, or speech inputs.

According to an embodiment, the user terminal 100 may provide a speech recognition service via an intelligent app (or speech recognition app) stored therein. In this case, for example, the user terminal 100 may recognize the user utterance or speech input received via the microphone 120 and provide the service corresponding to the recognized speech input to the user.

According to an embodiment, the user terminal 100 may perform a designated operation, alone or together with the intelligent server and/or service server, based on the speech input. For example, the user terminal 100 may execute the app corresponding to the speech input and perform a designated operation via the executed app.

According to an embodiment, when the user terminal 100, together with the intelligent server 200 and/or service server, provides the service, the user terminal 100 may detect a user utterance using the microphone and generate a speech signal (or speech data) corresponding to the detected user utterance. The user terminal may transmit the speech signal (or speech data) to the intelligent server 200 via the communication interface 110.

According to an embodiment, in response to (or as response data for) the speech input received from the user terminal 100, the intelligent server 200 may generate a plan for performing the task corresponding to the speech input or the result of the operation performed according to the plan. The plan may include a plurality of actions for performing the task corresponding to the user's speech input and a plurality of concepts related to the plurality of actions. The concept may be one defining parameters input upon execution of the plurality of actions or one defining the resultant value output by execution of the plurality of actions. The plan may include association information between the plurality of actions and the plurality of concepts.

According to an embodiment, the user terminal 100 may receive the response (or response data) using the communication interface 110. The user terminal 100 may output the speech signal generated inside the user terminal 100 to the outside using the speaker 130 or may output the image generated inside the user terminal 100 to the outside using the display 140.

Figure 2:
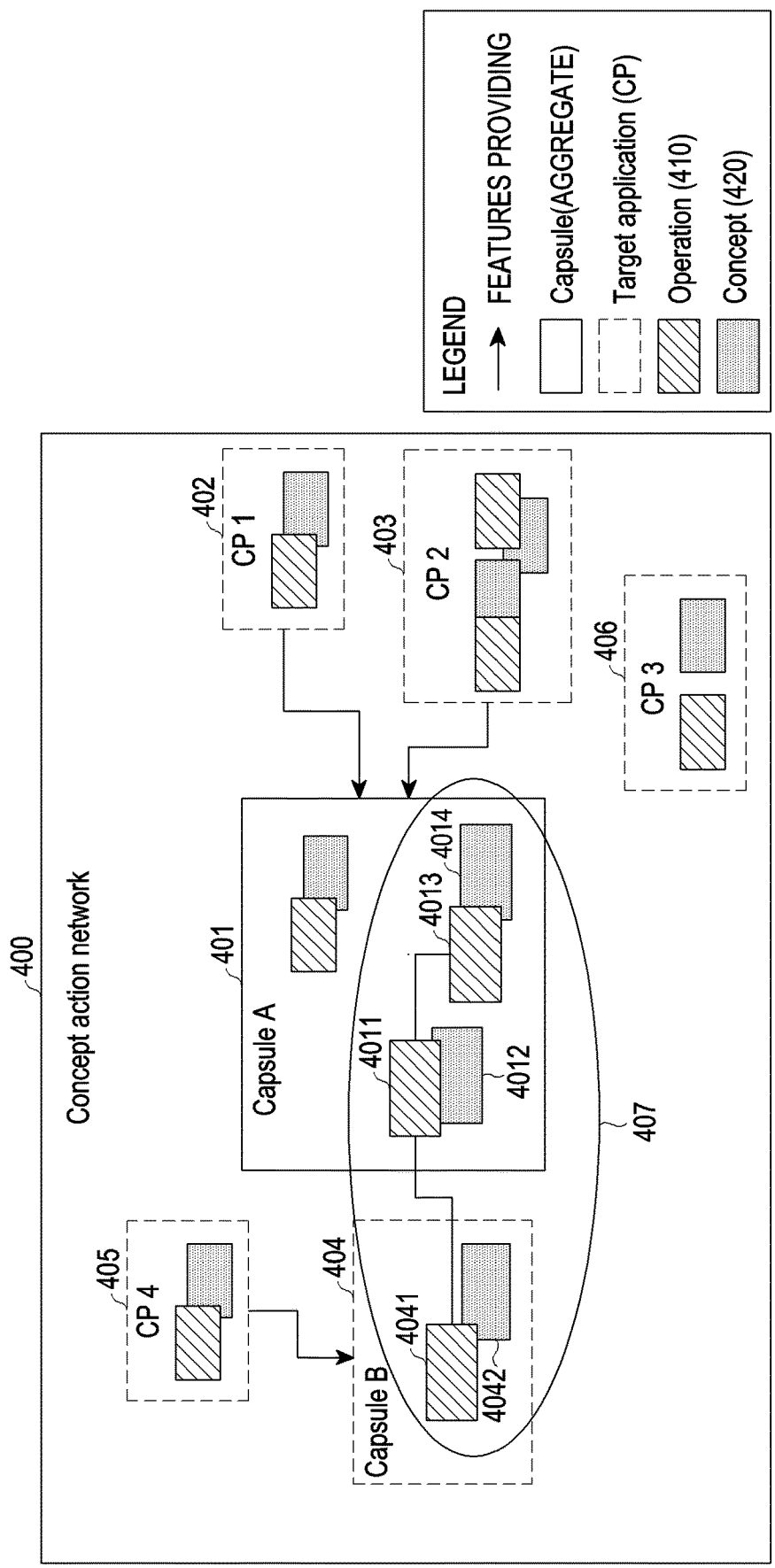
FIG. 2 is a diagram illustrating an example form in which relationship information between concept and operation is stored in a database according to various embodiments.

FIG. 2 is a diagram illustrating an example form in which relationship information between concept and operation is stored in a database according to various embodiments.

A capsule database (e.g., the capsule database 230) of the intelligent server 200 according to an embodiment may store capsules in the form of a concept action network (CAN) 400. The capsule database may store an operation for processing a task corresponding to the user's speech input and a parameter necessary for the operation in the form of the CAN 400.

The capsule database according to an embodiment may store a plurality of capsules (capsule (A) 401 and capsule (B) 404) respectively corresponding to a plurality of domains (e.g., applications). According to an embodiment, one capsule (e.g., capsule (A) 401) may correspond to one domain (e.g., location (geo), application). For example, one capsule may correspond to at least one service provider (e.g., CP 1 402, CP 2 403, CP 3 406, or CP 4 405) for performing a function for a domain related to the capsule. According to an embodiment, one capsule may include at least one or more operations 410 and at least one or more concepts 420 for performing a designated function.

The natural language platform 220 according to an embodiment may generate a plan for performing a task corresponding to the received speech input using a capsule stored in the capsule database. For example, the planner module 225 of the natural language platform 220 may generate a plan using a capsule stored in the capsule database. For example, a plan 407 may be generated using operations 4011 and 4013 and concepts 4012 and 4014 of capsule A 401 and an operation 4041 and concept 4042 of capsule B 404.

Figure 3:
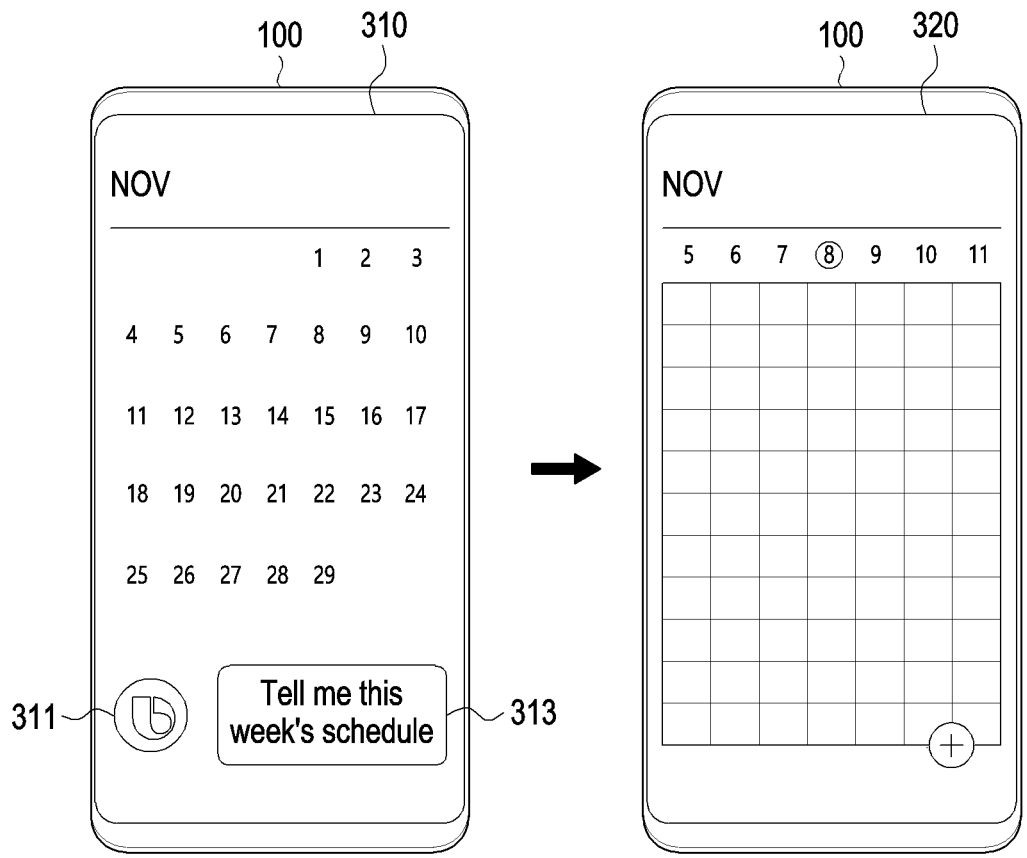
FIG. 3 is a diagram illustrating an example screen in which a user terminal processes a speech input received through an intelligent app according to various embodiments.

FIG. 3 is a diagram illustrating an example screen in which a user terminal processes a speech input received through an intelligent app according to various embodiments.

According to an embodiment, the user terminal 100 may execute an intelligent app to process user inputs through the intelligent server 200.

According to an embodiment, upon recognizing a designated speech input (e.g., a wake-up) or receiving an input through a hardware key (e.g., a dedicated hardware key) on a screen 310, the user terminal 100 may execute the intelligent app to process the speech input. The user terminal 100 may, for example, execute the intelligent app, with a scheduler app running According to an embodiment, the user terminal 100 may display an object (e.g., an icon) 311 corresponding to the intelligent app on the display 140. According to an embodiment, the user terminal 100 may receive a speech input by a user utterance. For example, the user terminal 100 may receive a speech input saying, "Tell me this week's schedule!" According to an embodiment, the user terminal 100 may display a user interface (UI) 313 (e.g., an input window) of the intelligent app displaying the text data of the received speech input on the display.

According to an embodiment, on a screen 320, the user terminal 100 may display a result corresponding to the received speech input on the display. For example, the user terminal 100 may receive the plan corresponding to the received user input, and display 'this week's schedule' on the display according to the plan.

Figure 4:
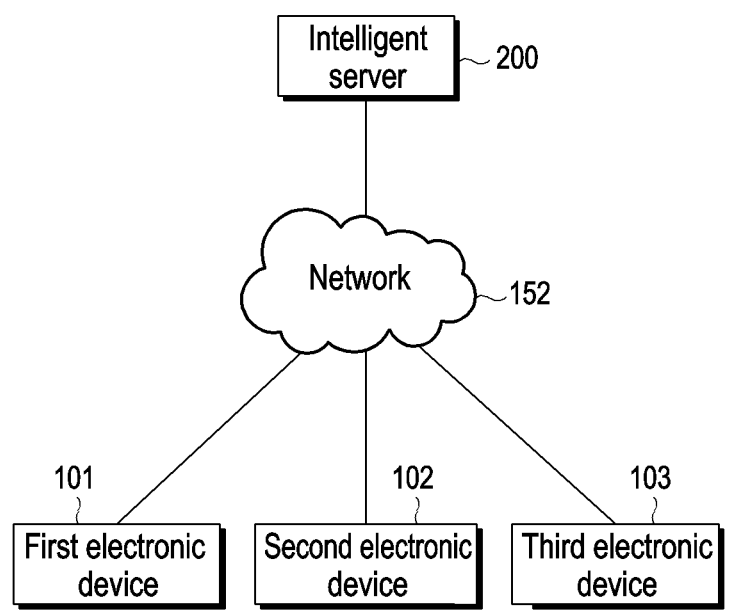
FIG. 4 is a diagram illustrating an example of an intelligent server and a plurality of electronic devices according to various embodiments.

FIG. 4 is a diagram illustrating an example intelligent server and a plurality of electronic devices according to various embodiments.

Referring to FIG. 4, according to an embodiment, the intelligent server 200 (also referred to as a server device or an electronic device) may communicate with a plurality of electronic devices through a network 152. For example, the plurality of electronic devices may include a first electronic device 101 and a second electronic device 102, and may further include at least one additional electronic device (e.g., a third electronic device 103). According to an embodiment, the intelligent server 200 may store information about a plurality of electronic devices designated to detect a specific user's utterance. For example, the first electronic device 101 or the second electronic device 102 may be the user terminal 100.

According to an embodiment, the intelligent server 200 may receive and process a first speech input corresponding to the user's first utterance from the first electronic device 101 and may transmit first response data corresponding to the processing result to the first electronic device 101. For example, the intelligent server 200 may generate first response data corresponding to a first plan for performing a first task corresponding to the first speech input corresponding to the user's first utterance or a result of performing an operation according to the first plan and transmit the same to the first electronic device 101.

According to an embodiment, the intelligent server 200 may identify the second electronic device 102 for detecting a second utterance associated with the first response data (which may hereinafter be simply referred to as a second utterance) within a designated time after the user's first utterance. According to an embodiment, the intelligent server 200 may transmit a control signal (e.g., a wake-up signal) for controlling to detect the user's utterance to the identified second electronic device 102.

According to an embodiment, the intelligent server 200 may receive a speech input corresponding to the user utterance detected from the second electronic device 102. According to an embodiment, when the speech input received from the second electronic device 102 is an input associated with the first speech input response session, the intelligent server 200 may identify that the speech input received from the second electronic device 102 is a second speech input corresponding to the second utterance. According to an embodiment, when the speech input received from the second electronic device 102 is received within a designated time after the first speech input corresponding to the user's first utterance is received and is a speech input associated with the first response data, the intelligent server 200 may identify that the speech input received from the second electronic device 102 is the second speech input corresponding to the second utterance.

According to an embodiment, the intelligent server 200 may process the identified second speech input corresponding to the second utterance and provide second response data corresponding to the processing result to the first electronic device 101. For example, the intelligent server may generate second response data corresponding to a second plan for performing a second task corresponding to the first speech input, the first response data, and the second speech input or a result of performing an operation according to the second plan and transmit the same to the first electronic device 101 (or the second electronic device 102).

Figure 5:
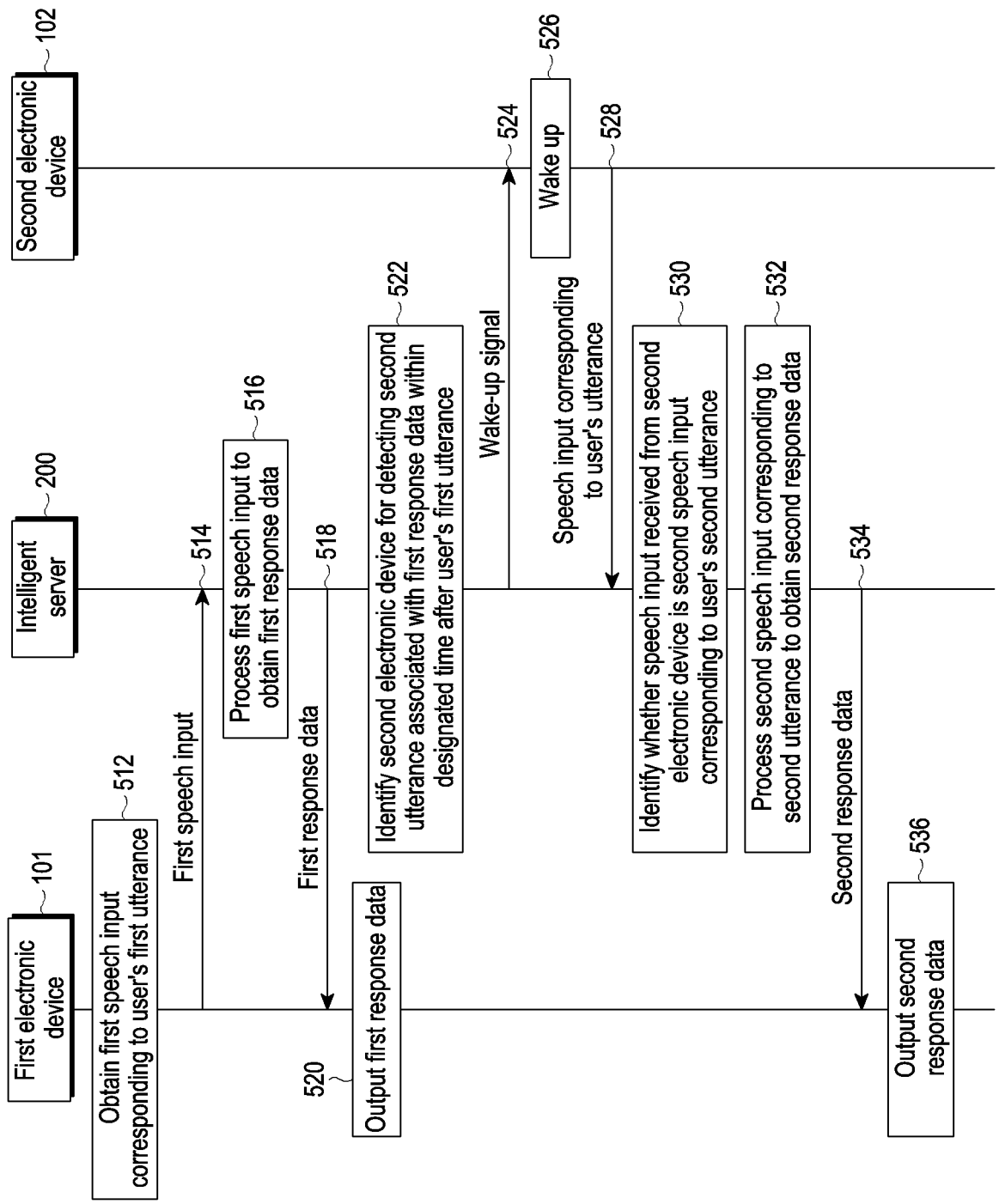
FIG. 5 is a signal flow diagram illustrating an example method for processing user utterances by an intelligent server, a first electronic device, and a second electronic device according to various embodiments.

FIG. 5 is a signal flow diagram illustrating an example method for processing user utterances by an intelligent server, a first electronic device, and a second electronic device according to various embodiments.

Referring to FIG. 5, in operation 512, according to an embodiment, the first electronic device 101 (e.g., the processor 160 of the user terminal 100 of FIG. 1) may obtain a first speech input corresponding to a first user utterance through a microphone (e.g., the microphone 120 of FIG. 1). For example, the first electronic device 101 may execute an intelligent app according to a designated input (or a wake-up command) (e.g., "Bixby") and obtain a first speech input (e.g., "Tell me nearby cafés") corresponding to the first speech input from the user through the microphone 120.

In operation 514, according to an embodiment, the first electronic device 101 may transmit the first speech input to the intelligent server 200. For example, the first electronic device 101 may convert the first speech input into first text data and transmit it to the intelligent server 200.

In operation 516, according to an embodiment, the intelligent server 200 may process the first speech input to thereby obtain first response data. For example, the intelligent server 200 may convert the first speech input received from the first electronic device 101 into first text data and analyze the first text data to thereby identify a first command corresponding to the first speech input and may obtain first response data corresponding to a first plan for performing a first task regarding the execution of the identified first command or a result of performing an operation according to the first plan. For example, the command may include at least one of a target application, a target function, or a parameter. According to an embodiment, the target application may correspond to the capsule or domain described in FIG. 1 or 2, and the target function and parameter, respectively, may correspond to the intent and parameters determined by the natural language understanding module 223 of FIG. 1. For example, the intelligent server 200 may analyze the first text data to identify a first command including a target application, a target function, and a parameter element, and based on the result of identifying the first command, obtain first response data corresponding to a first plan for performing a first task regarding the execution of the first command or a result of performing an operation according to the first plan. For example, when the first text data corresponding to the first speech input is "Tell me nearby cafés," the intelligent server 200 may perform a first command including a target application (e.g., a map application), a target function (e.g., search), and a parameter (e.g., a radius of 00 m from the current location, café), as a result of analysis of the first text. The intelligent server 200 may obtain first response data (e.g., "I'll tell you cafés around the current location," "coffee shop A," "coffee shop B," "coffee shop C") corresponding to a first plan for performing a first task regarding the execution of the first command or a result of performing an operation according to the first plan.

In operation 518, according to an embodiment, the intelligent server 200 may transmit the first response data obtained as a result of processing the first speech input to the first electronic device 101.

In operation 520, according to an embodiment, the first electronic device 101 may output the first response data. For example, when the first response data includes the first plan for performing the first task, the first electronic device 101 may perform an operation according to the first plan and output a sound and/or screen corresponding to the result of performing the operation (e.g., "I'll tell you cafés around the current location, "coffee shop A," "coffee shop B," "coffee shop C"). For example, when the first response data includes the result of performing the operation according to the first plan, the first electronic device 101 may output a sound and/or screen corresponding to the first response data (e.g., "I'll tell you cafés around the current location" "coffee shop A," "coffee shop B," "coffee shop C").

In operation 522, according to an embodiment, the intelligent server 200 may identify the second electronic device 102 for detecting a second utterance associated with the first response data within a designated time after the user's first utterance. For example, the intelligent server 200 may identify whether a wearable electronic device worn by the user of the first utterance is among a plurality of electronic devices, whether an electronic device is present within a designated distance from the user of the first utterance (or the first electronic device detecting the first utterance) among the plurality of electronic devices, or the second electronic device 102 among the plurality of electronic devices based on a result of identifying a user utterance detected by each of the plurality of electronic devices turning on the microphone after transmitting a control signal (e.g., a wake-up signal) for controlling to detect a user utterance to each of the plurality of electronic devices.

In operation 524, according to an embodiment, the intelligent server 200 may transmit a control signal (e.g., a wake-up signal) for controlling the second electronic device 102 to detect the user's utterance to the identified second electronic device 102.

In operation 526, according to an embodiment, the second electronic device 102 may perform a wake-up operation. For example, the second electronic device 102 may wake up and thus turn on the microphone to detect a user utterance. For example, the second electronic device 102 may execute the intelligent app in response to the reception of a wake-up signal from the intelligent server 200 instead of a designated input (or a wake-up command) (e.g., "Bixby") and may obtain a speech input (e.g., "Tell me the business hours of that") corresponding to the user utterance through the microphone.

In operation 528, according to an embodiment, the second electronic device 102 may transmit the speech input corresponding to the user speech to the intelligent server 200.

In operation 530, according to an embodiment, the intelligent server may identify whether the speech input (e.g., "Tell me the business hours of that") received from the second electronic device 102 is the second speech input corresponding to the user's second utterance. For example, when the speech input received from the second electronic device 102 is a speech input associated with the first speech input response session, the intelligent server 200 may identify that the speech input received from the second electronic device 102 is a second speech input corresponding to the user's second utterance. For example, when the speech input (e.g., "Tell me the business hours of that") received from the second electronic device 102 is received within a designated time after receiving the first speech input (e.g., "Tell me nearby cafés") corresponding to the user's first utterance and is a speech input associated with the first response data (e.g., "I'll tell you cafés around the current location," "coffee shop A," "coffee shop B," "coffee shop C"), the intelligent server 200 may identify that the speech input (e.g., "Tell me the business hours of that") received from the second electronic device 102 is the second speech input corresponding to the user's second utterance. For example, the intelligent server 200 may identify that the speech input received from the second electronic device 102 is the second speech input corresponding to the user's second utterance, based on whether the speech input received from the second electronic device 102 includes a speech corresponding to an operation interruption, whether the speech input received from the second electronic device 102 includes a speech included in the first response data for the first utterance, or whether the speech input received from the second electronic device 102 includes a speech corresponding to a demonstrative pronoun.

In operation 532, according to an embodiment, the intelligent server may process the second speech input corresponding to the second utterance and obtain second response data corresponding to the processing result. For example, the intelligent server 200 may obtain (or generate) second response data (e.g., "The business hours of coffee shop B are from 9:00 AM to 9:00 PM") corresponding to a second plan for performing a second task regarding the execution of a second command (e.g., "Tell me the business hours of coffee shop B"), corresponding to the first speech input (e.g., "Tell me nearby cafés"), the first response data (e.g., "I'll tell you cafés around the current location," "coffee shop A," "coffee shop B," "coffee shop C"), and the second speech input (e.g., "Tell me the business hours of that") or a result of performing an operation according to the second plan.

In operation 534, according to an embodiment, the intelligent server 200 may transmit the second response data to the first electronic device 101 (or the second electronic device 102).

In operation 536, according to an embodiment, the first electronic device 101 may output the second response data. For example, when the second response data includes the second plan for performing the second task, the first electronic device 101 may perform an operation according to the second plan and output a sound and/or screen corresponding to the result of performing the operation (e.g., "The business hours of coffee shop B are from 9:00 AM to 9:00 PM"). For example, when the second response data includes the result of performing the operation according to the second plan, the first electronic device 101 may output a sound and/or screen corresponding to the second response data (e.g., "The business hours of coffee shop B are from 9:00 AM to 9:00 PM").

Figure 6:
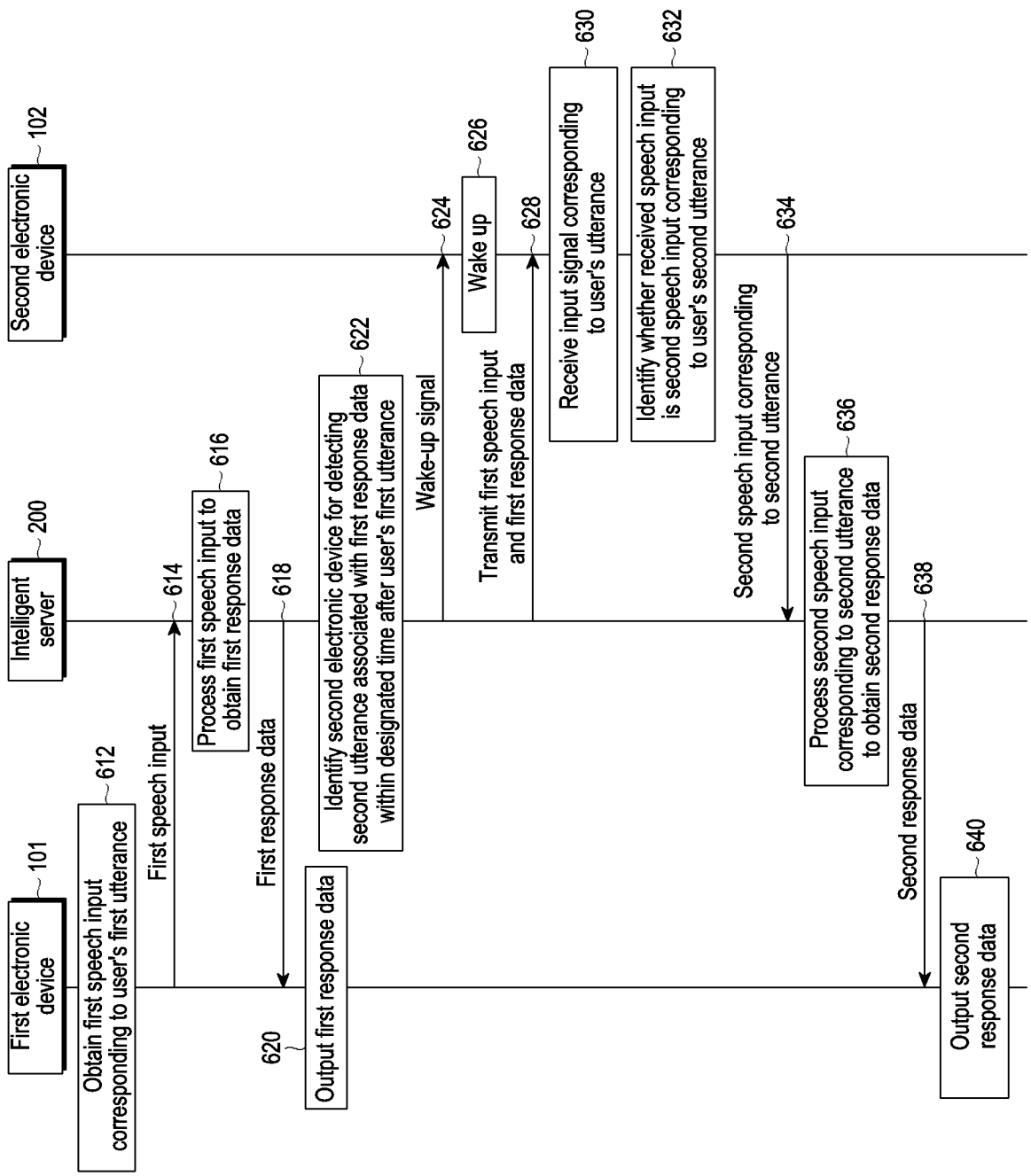
FIG. 6 is a signal flow diagram illustrating an example method of processing user utterances by an intelligent server, a first electronic device, and a second electronic device according to various embodiments.

FIG. 6 is a signal flow diagram illustrating an example method of processing user utterances by an intelligent server, a first electronic device, and a second electronic device according to various embodiments.

Referring to FIG. 6, in operation 612, according to an embodiment, the first electronic device 101 (e.g., the processor 160 of the user terminal 100 of FIG. 1) may obtain a first speech input corresponding to a first user utterance through a microphone (e.g., the microphone 120 of FIG. 1). For example, the first electronic device 101 may execute an intelligent app according to a designated input (or a wake-up command) (e.g., "Bixby") and obtain a first speech input (e.g., "Tell me nearby cafés") corresponding to the first speech input from the user through the microphone 120.

In operation 614, according to an embodiment, the first electronic device 101 may transmit the first speech input to the intelligent server 200. For example, the first electronic device 101 may convert the first speech input into first text data and transmit it to the intelligent server 200.

In operation 616, according to an embodiment, the intelligent server 200 may process the first speech input to thereby obtain first response data. For example, the intelligent server 200 may convert the first speech input received from the first electronic device 101 into first text data and analyze the first text data to thereby identify a first command corresponding to the first speech input and may obtain first response data corresponding to a first plan for performing a first task regarding the execution of the identified first command or a result of performing an operation according to the first plan. For example, the command may include at least one of a target application, a target function, or a parameter. According to an embodiment, the target application may correspond to the capsule or domain described in FIG. 1 or FIG. 2, and the target function and parameter, respectively, may correspond to the intent and parameters determined by the natural language understanding module 223 of FIG. 1. For example, the intelligent server 200 may analyze the first text data to identify a first command including a target application, a target function, and a parameter element, and based on the result of identifying the first command, obtain first response data corresponding to a first plan for performing a first task regarding the execution of the first command or a result of performing an operation according to the first plan. For example, when the first text data corresponding to the first speech input is "Tell me nearby cafés," the intelligent server 200 may perform a first command including a target application (e.g., a map application), a target function (e.g., search), and a parameter (e.g., a radius of 00 m from the current location, café), as a result of analysis of the first text. The intelligent server 200 may obtain first response data (e.g., "I'll tell you cafés around the current location," "coffee shop A," "coffee shop B," "coffee shop C") corresponding to a first plan for performing a first task regarding the execution of the first command or a result of performing an operation according to the first plan.

In operation 618, according to an embodiment, the intelligent server 200 may transmit the first response data obtained as a result of processing the first speech input to the first electronic device 101.

In operation 620, according to an embodiment, the first electronic device 101 may output the first response data. For example, when the first response data includes the first plan for performing the first task, the first electronic device 101 may perform an operation according to the first plan and output a sound and/or screen corresponding to the result of performing the operation (e.g., "I'll tell you cafés around the current location, "coffee shop A," "coffee shop B," "coffee shop C"). For example, when the first response data includes the result of performing the operation according to the first plan, the first electronic device 101 may output a sound and/or screen corresponding to the first response data (e.g., "I'll tell you cafés around the current location" "coffee shop A," "coffee shop B," "coffee shop C").

In operation 622, according to an embodiment, the intelligent server 200 may identify the second electronic device 102 for detecting a second utterance associated with the first response data within a designated time after the user's first utterance. For example, the intelligent server 200 may identify whether a wearable electronic device worn by the user of the first utterance is among a plurality of electronic devices, whether an electronic device is present within a designated distance from the user of the first utterance (or the first electronic device detecting the first utterance) among the plurality of electronic devices, or the second electronic device 102 among the plurality of electronic devices based on a result of identifying a user utterance detected by each of the plurality of electronic devices turning on the microphone after transmitting a control signal (e.g., a wake-up signal) for controlling to detect a user utterance to each of the plurality of electronic devices.

In operation 624, according to an embodiment, the intelligent server 200 may transmit a control signal (e.g., a wake-up signal) for controlling the second electronic device 102 to detect the user's utterance to the identified second electronic device 102.

In operation 626, according to an embodiment, the second electronic device 102 may perform a wake-up operation. For example, the second electronic device 102 may wake up and thus turn on the microphone to detect a user utterance. For example, the second electronic device 102 may execute the intelligent app in response to the reception of a wake-up signal from the intelligent server 200 instead of a designated input (or a wake-up command) (e.g., "Bixby").

In operation 628, the intelligent server 200 according to an embodiment transmits a first speech input to the second electronic device 102 (e.g., "Tell me nearby cafés") and first response data (e.g., "I'll tell you cafés around the current location, "coffee shop A," "coffee shop B," "coffee shop C").

In operation 630, according to an embodiment, the second electronic device 102 may receive input signal corresponding to user's utterance. The second electronic device 102 may obtain a speech input (e.g., "Tell me the business hours of that") corresponding to the user utterance through the microphone.

In operation 632, according to an embodiment, the second electronic device 102 may identify whether the obtained speech input (e.g., "Tell me the business hours of that") corresponding to the user utterance is the second speech input corresponding to the user's second utterance. For example, when the obtained speech input (e.g., "Tell me the business hours of that") corresponding to the user utterance is a speech input associated with the first speech input response session, the second electronic device 102 may identify that the obtained speech input (e.g., "Tell me the business hours of that") corresponding to the user utterance is the second speech input corresponding to the user's second utterance. For example, when the obtained speech input (e.g., "Tell me the business hours of that") corresponding to the user utterance is received within a designated time after receiving the first speech input (e.g., "Tell me nearby cafés") corresponding to the user's first utterance and is a speech input associated with the first response data (e.g., "I'll tell you cafés around the current location," "coffee shop A," "coffee shop B," "coffee shop C"), the second electronic device 102 may identify that the speech input (e.g., "Tell me the business hours of that") received from the second electronic device 102 is the second speech input corresponding to the user's second utterance. For example, the second electronic device 102 may identify that the received speech input is the second speech input corresponding to the user's second utterance, based on whether the received speech input includes a speech corresponding to an operation interruption, whether the received speech input includes a speech included in the first response data for the first utterance, or whether the received speech input includes a speech corresponding to a demonstrative pronoun.

In operation 634, according to an embodiment, the second electronic device 102 may transmit the identified second speech input corresponding to the user speech to the intelligent server 200.

In operation 636, according to an embodiment, the intelligent server may process the second speech input corresponding to the second utterance and obtain second response data corresponding to the processing result. For example, the intelligent server 200 may obtain (or generate) second response data (e.g., "The business hours of coffee shop B are from 9:00 AM to 9:00 PM") corresponding to a second plan for performing a second task regarding the execution of a second command (e.g., "Tell me the business hours of coffee shop B"), corresponding to the first speech input (e.g., "Tell me nearby cafés"), the first response data (e.g., "I'll tell you cafés around the current location," "coffee shop A," "coffee shop B," "coffee shop C"), and the second speech input (e.g., "Tell me the business hours of that") or a result of performing an operation according to the second plan.

In operation 638, according to an embodiment, the intelligent server 200 may transmit the second response data to the first electronic device 101 (or the second electronic device 102).

In operation 640, according to an embodiment, the first electronic device 101 may output the second response data. For example, when the second response data includes the second plan for performing the second task, the first electronic device 101 may perform an operation according to the second plan and output a sound and/or screen corresponding to the result of performing the operation (e.g., "The business hours of coffee shop B are from 9:00 AM to 9:00 PM"). For example, when the second response data includes the result of performing the operation according to the second plan, the first electronic device 101 may output a sound and/or screen corresponding to the second response data (e.g., "The business hours of coffee shop B are from 9:00 AM to 9:00 PM").

Figure 7:
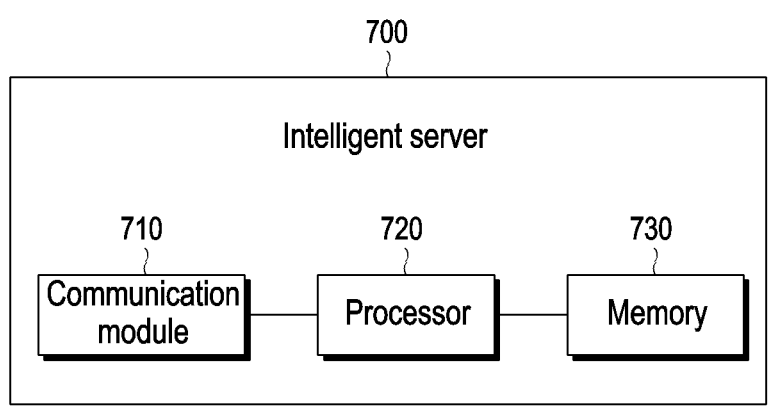
FIG. 7 is a block diagram illustrating an example configuration of an intelligent server according to various embodiments.

FIG. 7 is a block diagram illustrating an example configuration of an intelligent server according to various embodiments.

Referring to FIG. 7, an intelligent server 700 (e.g., the intelligent server 200 of FIG. 1) according to an embodiment may include a communication module (e.g., including communication circuitry) 710, a processor (e.g., including processing circuitry) 720, and a memory 730.

According to an embodiment, the communication module 710 (e.g., the front end 210 of FIG. 1) may include various communication circuitry and support an establishment of a direct (e.g., wired) communication channel or wireless communication channel between a plurality of electronic devices (e.g., the first electronic device 101 and the second electronic device 102) and communication via the established communication channel. The communication module 710 may include one or more communication processors that are operable independently from the processor 720 and supports a direct (e.g., wired) communication or a wireless communication. According to an embodiment, the communication module 710 may include a wireless communication module (e.g., a cellular communication module, a short-range wireless communication module, or a global navigation satellite system (GNSS) communication module) or a wired communication module (e.g., a local area network (LAN) communication module or a power line communication (PLC) module).

According to an embodiment, the processor 720 (e.g., a server processor) may include various processing circuitry and control at least one other component (e.g., a hardware or software component) of the intelligent server 200 connected to the processor 720 and perform various data processing or computation. According to one embodiment, as at least part of the data processing or computation, the processor 720 may store a command or data received from another component (e.g., the communication module 190) in the memory 130, process the command or the data stored in the memory 130, and store resulting data in the memory 130.

According to an embodiment, the processor 720 may include a hardware structure specified for artificial intelligence model processing. The artificial intelligence model may be generated via machine learning. Learning algorithms may include, but are not limited to, e.g., supervised learning, unsupervised learning, semi-supervised learning, reinforcement learning, or the like. The artificial intelligence model may include a plurality of artificial neural network layers. The artificial neural network may include, for example, and without limitation, a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network, or the like, or a combination of two or more thereof but is not limited thereto. The artificial intelligence model may, additionally or alternatively, include a software structure other than the hardware structure.

According to an embodiment, the processor 720 may include at least one processor to process the operation of a natural language platform (e.g., the natural language platform 220 of FIG. 2), an execution engine (e.g., the execution engine 240 of FIG. 2), an end user interface (e.g., the end user interface 250), a management platform (e.g., the management platform 260 of FIG. 2), a big data platform (e.g., the big data platform 270 of FIG. 2), or an analytic platform (e.g., the analytic platform of FIG. 2).

According to an embodiment, the processor 720 may receive, through the communication module 710, and process a first speech input corresponding to the user's first utterance from the first electronic device 101 and may transmit first response data corresponding to the processing result to the first electronic device 101 through the communication module 710 of the first electronic device 101. For example, the processor 720 may generate first response data corresponding to a first plan for performing a first task corresponding to the first speech input corresponding to the user's first utterance or a result of performing an operation according to the first plan, using the natural language platform 250, the execution engine 240, the end user interface 250, the management platform 260, the big data platform 270, and/or the analytic platform 280. For example, the processor 720 may transmit the first response data to the first electronic device 101 through the communication module 710.

According to an embodiment, the processor 720 may identify the second electronic device 102 for detecting a second utterance associated with the first response data (hereinafter, simply referred to as a second utterance) within a designated time after the user's first utterance. According to an embodiment, the processor 720 may identify the second electronic device 102 for detecting a second utterance associated with the first response data within a designated time after the user's first utterance. For example, the processor 720 may identify whether a wearable electronic device worn by the user of the first utterance is among a plurality of electronic devices, whether an electronic device is present within a designated distance from the user of the first utterance (or the first electronic device detecting the first utterance) among the plurality of electronic devices, or the second electronic device 102 among the plurality of electronic devices based on a result of identifying a user utterance detected by each of the plurality of electronic devices turning on the microphone after transmitting a control signal (e.g., a wake-up signal) for controlling to detect a user utterance to each of the plurality of electronic devices.

According to an embodiment, the processor 720 may transmit a control signal (e.g., a wake-up signal) for controlling to detect the user's utterance to the identified second electronic device 102 through the communication module 710. For example, the control signal (e.g., a wake-up signal) for controlling to detect the user's utterance may be a signal to turn on the microphone to thereby detect the user's utterance and transmit the detected user utterance to the intelligent server 700 when received by the second electronic device 102. According to an embodiment, in response to the control signal (e.g., the wake-up signal) for controlling to detect the user's utterance, the processor 720 may receive a speech input from the second electronic device 102 through the communication module 710.

According to an embodiment, the processor 720 may identify whether the received speech input is a second speech input corresponding to the user's second utterance. For example, when the speech input received from the second electronic device 102 is a speech input associated with the first speech input response session, the processor 720 may identify that the speech input received from the second electronic device 102 is a second speech input corresponding to the user's second utterance. For example, the processor 720 may identify whether the speech input received from the second electronic device 102 is a speech input that is received within a designated time after receiving the first speech input (e.g., "Tell me nearby cafés") corresponding to the user's first utterance and is associated with the first response data (e.g., "I'll tell you cafés around the current location," "coffee shop A," "coffee shop B," "coffee shop C"). For example, when the second speech input is a speech input that is received within a designated time after receiving the first speech input and is associated with the first response data, the processor 720 may identify that the speech input (e.g., "Tell me the business hours of that") received from the second electronic device 102 is the second speech input corresponding to the user's second utterance. For example, the processor 720 may identify that the speech input received from the second electronic device 102 is the second speech input corresponding to the user's second utterance, based on whether the speech input received from the second electronic device 102 includes a speech corresponding to an operation interruption, whether the speech input received from the second electronic device 102 includes a speech included in the first response data for the first utterance, or whether the speech input received from the second electronic device 102 includes a speech corresponding to a demonstrative pronoun.

According to an embodiment, the processor 720 may process the second speech input corresponding to the second utterance and obtain second response data corresponding to the processing result. For example, the processor 720 may obtain (or generate) second response data (e.g., "The business hours of coffee shop B are from 9:00 AM to 9:00 PM") corresponding to a second plan for performing a second task regarding the execution of a second command (e.g., "Tell me the business hours of coffee shop B"), corresponding to the first speech input (e.g., "Tell me nearby cafés"), the first response data (e.g., "I'll tell you cafés around the current location," "coffee shop A," "coffee shop B," "coffee shop C"), and the second speech input (e.g., "Tell me the business hours of that") or a result of performing an operation according to the second plan, using the natural language platform 220, the execution engine 240, the end user interface 250, the management platform 260, the big data platform 270, and/or the analytic platform 280. For example, the processor 720 may transmit the second response data to the first electronic device 101 (or the second electronic device 102) through the communication module 710.

According to an embodiment, the memory 730 may store various data used by at least one component (e.g., the processor 720 or the communication module 710) of the intelligent server 700. The various data may include, for example, software (e.g., the program) and input data or output data for a command related thereto. According to an embodiment, the memory 730 may include a capsule database (e.g., the capsule database 230 of FIG. 1). According to an embodiment, the memory 730 may store instructions configured to, when executed, enable the processor 720 to perform various operations described above and information or data associated with the instructions.

According to an example embodiment, an electronic device (e.g., the intelligent server 200 of FIG. 1 or the intelligent server 700 of FIG. 7) may comprise: a communication module including communication circuitry (e.g., the communication interface 110 of FIG. 1 or the communication module 710 of FIG. 7), a memory (e.g., the memory 130 of FIG. 7), and at least one processor (e.g., the processor 720 of FIG. 7). The memory may store instructions, which when executed, cause the at least one processor to control the electronic device to: transmit first response data obtained by processing a first speech input corresponding to a first utterance received from a first electronic device to the first electronic device through the communication module, identify a second electronic device comprising circuitry configured to detect a second utterance associated with the first response data within a designated time after the first utterance, transmit a wake-up signal to the second electronic device and receive, from the second electronic device, a speech input corresponding to an utterance obtained by a turn-on of a microphone based on the wake-up signal, identify whether the received speech input corresponding to the utterance is a second speech input corresponding to the second utterance, obtain second response data obtained by processing the second speech input based on the first speech input and the first response data based on the second speech input corresponding to the second utterance being identified, and transmit the second response data to at least one of the first electronic device or the second electronic device through the communication module.

According to an example embodiment, the at least one processor may be configured to identify the second electronic device among a plurality of electronic devices associated with a user.

According to an example embodiment, the at least one processor may be configured to: convert the first speech input into first text data, identify a first command corresponding to the first speech input by processing the first text data, and obtain the first response data corresponding to a first plan for performing a first task regarding an execution of the first command.

According to an example embodiment, the at least one processor may be configured to identify that a wearable electronic device worn by the user of the first utterance among the plurality of electronic devices is the second electronic device.

According to an example embodiment, a closest electronic device within a designated distance from the user of the first utterance among the plurality of electronic devices may be identified as the second electronic device.

According to an example embodiment, the at least one processor may be configured to control the electronic device to: receive a plurality of utterances detected as each of the plurality of electronic devices turns on a microphone based on a wake-up signal being transmitted to each of the plurality of electronic devices, compare the plurality of user utterances, and identify the second electronic device among the plurality of electronic devices.

According to an example embodiment, the at least one processor may be configured to identify that the speech input corresponding to the user utterance is the second speech input corresponding to the second utterance based on the speech input corresponding to the user utterance received from the second electronic device including a speech corresponding to an operation interruption.

According to an example embodiment, the at least one processor may be configured to identify that the speech input corresponding to the utterance is the second speech input corresponding to the second utterance based on the speech input corresponding to the user utterance received from the second electronic device including a speech included in the second response data for the first utterance.

According to an example embodiment, the at least one processor may be configured to identify that the speech input corresponding to the utterance is the second speech input corresponding to the second utterance based on the speech input corresponding to the user utterance received from the second electronic device including a speech corresponding to a demonstrative pronoun.

Figure 8:
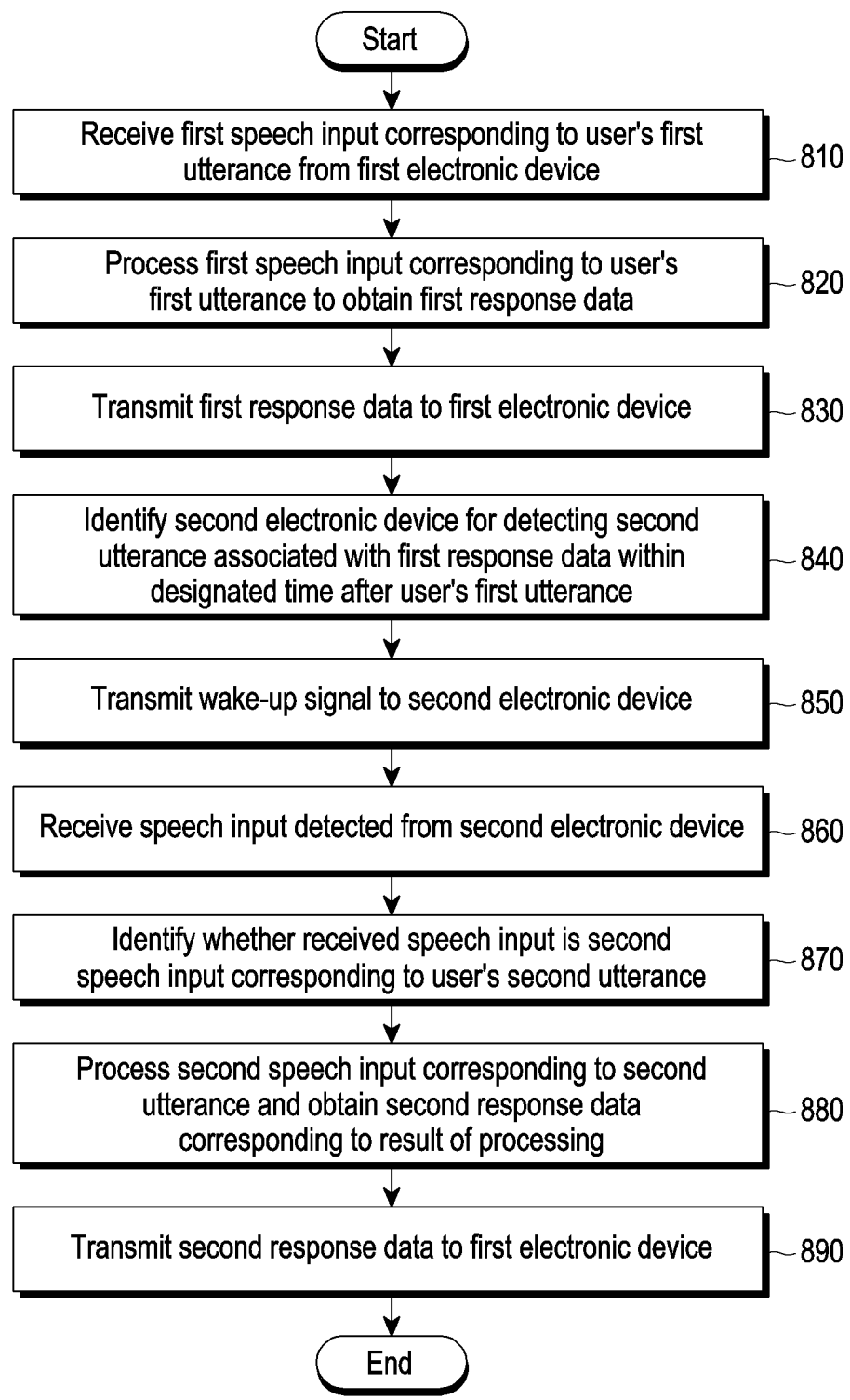
FIG. 8 is a flowchart illustrating an example operation of processing a user utterance by an intelligent server according to various embodiments.

FIG. 8 is a flowchart illustrating an example operation of processing a user utterance by an intelligent server according to various embodiments.

Referring to FIG. 8, according to an embodiment, a processor 720 of an intelligent server (e.g., the intelligent server 200 of FIG. 1 or the intelligent server 700 of FIG. 7) may perform at least one of operations 810 to 890.

In operation 810, according to an embodiment, the processor 720 may receive a first speech input corresponding to the user's first utterance from the first electronic device 101 through the communication module 710. For example, the processor 720 may receive a first speech input (e.g., "Tell me nearby cafés") corresponding to the user's first utterance obtained through the microphone 120 based on an intelligent app executed on the first electronic device 101 according to a designated input (or a wake-up command) (e.g., "Bixby") from the first electronic device 101 through the communication module 710. For example, the first speech input may be in the form of text data (e.g., first text data).

In operation 820, according to an embodiment, the processor 720 may process the first speech input corresponding to the user's first utterance to obtain first response data. For example, the processor 720 may obtain (or generate) first response data corresponding to a first plan for performing a first task corresponding to the first speech input corresponding to the user's first utterance or a result of performing an operation according to the first plan, using the natural language platform 250, the execution engine 240, the end user interface 250, the management platform 260, the big data platform 270, and/or the analytic platform 280. For example, the processor 720 may analyze the first speech input (or first text data) received from the first electronic device to thereby identify a first command corresponding to the first speech input and may obtain first response data corresponding to a first plan for performing a first task regarding the execution of the identified first command or a result of performing an operation according to the first plan. For example, the command may include at least one of a target application, a target function, or a parameter. According to an embodiment, the target application may correspond to the capsule or domain described in FIG. 1, and the target function and parameter, respectively, may correspond to the intent and parameters determined by the natural language understanding module 223 of FIG. 1. For example, the intelligent server 200 may analyze the first text data to identify a first command including a target application, a target function, and a parameter element, and based on the result of identifying the first command, obtain first response data corresponding to a first plan for performing a first task regarding the execution of the first command or a result of performing an operation according to the first plan. For example, when the first text data corresponding to the first speech input is "Tell me nearby cafés," the processor 720 may perform a first command including a target application (e.g., a map application), a target function (e.g., search), and a parameter (e.g., a radius of 00 m from the current location, café), as a result of analysis of the first text. The intelligent server 200 may obtain first response data (e.g., "I'll tell you cafés around the current location," "coffee shop A," "coffee shop B," "coffee shop C") corresponding to a first plan for performing a first task regarding the execution of the first command or a result of performing an operation according to the first plan.

In operation 830, according to an embodiment, the processor 720 may transmit the first response data obtained as a result of processing the first speech input to the first electronic device 101 through the communication module 710.

In operation 840, according to an embodiment, the processor 720 may identify the second electronic device 102 for detecting a second utterance associated with the first response data within a designated time after the user's first utterance. According to an embodiment, the processor 720 may identify at least one more electronic device to detect a third utterance associated with the second response data within a designated time after the user's second utterance, in addition to the second electronic device 102.

In operation 850, according to an embodiment, the processor 720 may transmit a control signal (e.g., a wake-up signal) for controlling the second electronic device 102 to detect the user's utterance to the identified second electronic device 102 through the communication module 710. According to an embodiment, upon identifying a plurality of electronic devices, the processor 720 may transmit a control signal (e.g., a wake-up signal) for controlling to detect the user's utterance to each of the plurality of electronic devices through the communication module 710. For example, the control signal (e.g., a wake-up signal) for controlling to detect the user's utterance may be a signal to turn on the microphone to thereby detect the user's utterance and transmit the detected user utterance to the intelligent server 700 when received by the second electronic device 102 (or each of the plurality of electronic devices).

In operation 860, according to an embodiment, the processor 720 may receive a speech input detected from the second electronic device 102 through the communication module 710 (in response to the control signal (e.g., the wake-up signal) for controlling to detect the user's utterance).

In operation 870, according to an embodiment, the processor 720 may identify whether the speech input received from the second electronic device 102 is a second speech input corresponding to the user's second utterance. For example, when the speech input received from the second electronic device 102 is a speech input associated with the first speech input response session, the processor 720 may identify that the speech input received from the second electronic device 102 is a second speech input corresponding to the user's second utterance. For example, the processor 720 may identify whether the speech input (e.g., "Tell me the business hours of that") received from the second electronic device 102 is a speech input that is received within a designated time after receiving the first speech input (e.g., "Tell me nearby cafés") corresponding to the user's first utterance and is associated with the first response data (e.g., "I'll tell you cafés around the current location," "coffee shop A," "coffee shop B," "coffee shop C"). For example, when the second speech input is a speech input that is received within a designated time after receiving the first speech input and is associated with the first response data, the processor 720 may identify that the speech input (e.g., "Tell me the business hours of that") received from the second electronic device 102 is the second speech input corresponding to the user's second utterance.

In operation 880, according to an embodiment, the processor 720 may process the second speech input corresponding to the second utterance and obtain second response data corresponding to the processing result. For example, the processor 720 may obtain (or generate) second response data corresponding to a second plan for performing a second task corresponding to the first speech input, the first response data, and the second speech input or a result of performing an operation according to the second plan, using the natural language platform 250, the execution engine 240, the end user interface 250, the management platform 260, the big data platform 270, and/or the analytic platform 280. For example, the processor 720 may obtain (or generate) second response data (e.g., "The business hours of coffee shop B are from 9:00 AM to 9:00 PM") corresponding to a second plan for performing a second task regarding the execution of a second command (e.g., "Tell me the business hours of coffee shop B"), corresponding to the first speech input (e.g., "Tell me nearby cafés"), the first response data (e.g., "I'll tell you cafés around the current location," "coffee shop A," "coffee shop B," "coffee shop C"), and the second speech input (e.g., "Tell me the business hours of that") or a result of performing an operation according to the second plan.

In operation 890, the processor 720 may transmit the second response data to the first electronic device 101 (or the second electronic device 102) through the communication module 710.

Figure 9:
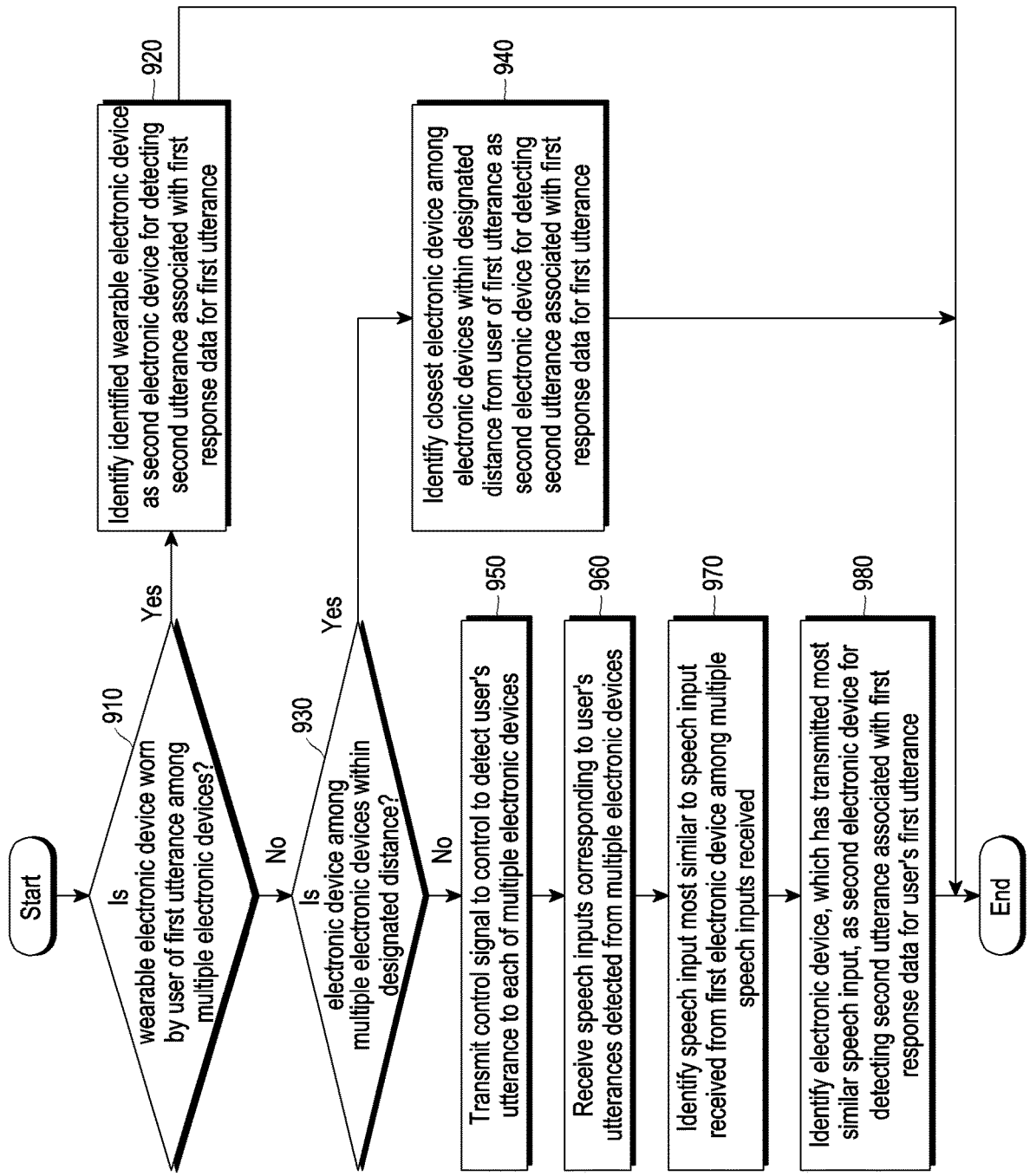
FIG. 9 is a flowchart illustrating an example operation of identifying an electronic device to detect a second utterance associated with first response data for a user's first utterance by an intelligent server according to various embodiments.

FIG. 9 is a flowchart illustrating an example operation of identifying an electronic device to detect a second utterance associated with first response data for a user's first utterance by an intelligent server according to various embodiments.

Referring to FIG. 9, according to an embodiment, a processor 720 of an intelligent server (e.g., the intelligent server 200 of FIG. 1 or the intelligent server 700 of FIG. 7) may perform at least one of operations 910 to 980.

In operation 910, according to an embodiment, the processor 720 may determine whether a wearable electronic device worn by the user of the first utterance is among a plurality of electronic devices. For example, the plurality of electronic devices may be electronic devices capable of detecting utterances, including a microphone. For example, the processor 720 may identify information about plurality of electronic devices capable of detecting utterances, stored in the memory 730. For example, the processor 720 may receive the information about the wearable electronic device worn by the user from the first electronic device 101 receiving the first speech input for the user's first utterance, thereby identifying whether there is the wearable electronic device worn by the user of the first utterance.

In operation 920, according to an embodiment, upon identifying the wearable electronic device worn by the user of the first utterance ("Yes" in operation 910), the processor 720 may identify that the identified wearable electronic device is the second electronic device 102 for detecting the second utterance associated with the first response data for the first utterance.

In operation 930, when the wearable electronic device worn by the user of the first utterance is not identified ("No" in operation 910), the processor 720 may identify whether an electronic device is present within a designated distance from the user of the first utterance (or the first electronic device detecting the first utterance) among the plurality of electronic devices. For example, the processor 720 may receive information about the electronic device within the designated distance identified via a sensor or communication (e.g., ultra-wideband (UWB) communication) from the first electronic device 101 receiving the first speech input for the user's first utterance to thereby identify the presence or absence of the electronic device within the designated distance from the user of the first utterance.

In operation 940, according to an embodiment, when there are electronic devices within the designated distance from the user of the first utterance ("Yes" in operation 930), the processor 720 may identify that the closest electronic device is the second electronic device 102 for detecting the second utterance associated with the first response data for the first utterance.

In operation 950, according to an embodiment, when the wearable electronic device worn by the user of the first utterance is not identified, and when no electronic device is present within the designated distance from the user of the first utterance ("No" in operation 930), the processor 720 may transmit a control signal (e.g., a wake-up signal) for controlling any of a plurality of electronic devices to detect the user's utterance to each of the plurality of electronic devices. For example, the control signal (e.g., a wake-up signal) for controlling to detect the user's utterance may be a signal to allow each of the plurality of identified electronic devices to turn on the microphone to thereby detect the user's utterance and transmit the detected user utterance to the intelligent server 700.

In operation 960, according to an embodiment, the processor 720 may receive speech inputs corresponding to user utterances individually detected by the plurality of electronic devices.

In operation 970, according to an embodiment, the processor 720 may determine a speech input most similar to the speech input received from the first electronic device 101 among the plurality of received speech inputs.

In operation 980, according to an embodiment, the processor 720 may identify that the electronic device transmitting the speech input most similar to the speech input received from the first electronic device 101 among the plurality of electronic devices is the second electronic device 102 for detecting the second utterance associated with the first response data for the user's first utterance.

Figure 10:
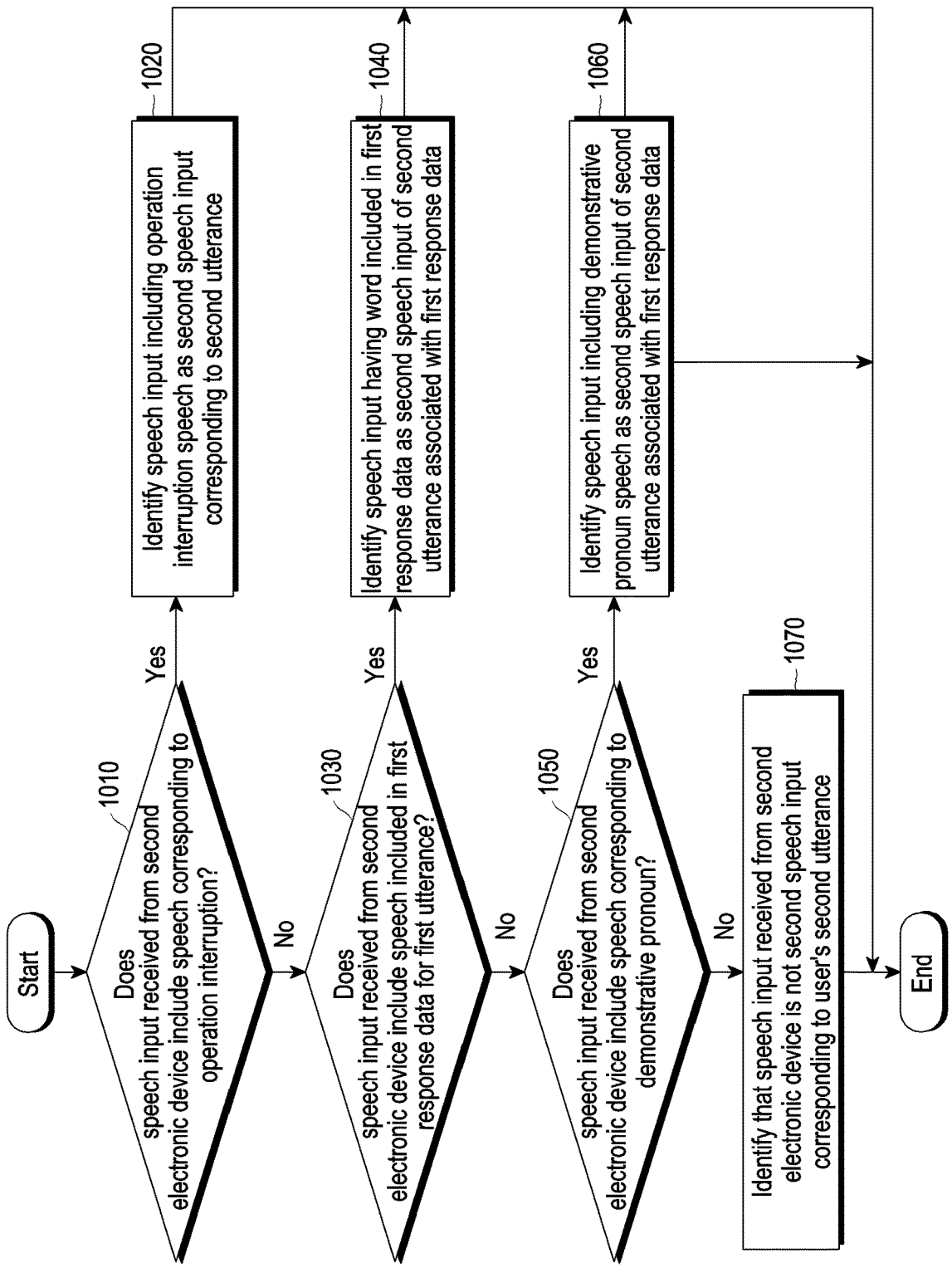
FIG. 10 is a flowchart illustrating an example operation of identifying whether a speech input received from a second electronic device is a second speech input corresponding to a user's second utterance by an intelligent server according to various embodiments.

FIG. 10 is a flowchart illustrating an example operation of identifying whether a speech input received from a second electronic device is a second speech input corresponding to a user's second utterance by an intelligent server according to various embodiments.

Referring to FIG. 10, according to an embodiment, a processor 720 of an intelligent server (e.g., the intelligent server 200 of FIG. 1 or the intelligent server 700 of FIG. 7) may perform at least one of operations 1010 to 1070.

In operation 1010, according to an embodiment, the processor 720 may identify whether the speech input received from the second electronic device 102 includes a speech corresponding to an operation interruption. For example, a speech corresponding to an operation interruption may be "stop", "cancel", "pause", or other similar speeches.

In operation 1020, according to an embodiment, when the speech input received from the second electronic device 102 includes a speech corresponding to an operation interruption ("Yes" in operation 1010), the processor 720 may identify that the speech input received from the second electronic device 102 is the second speech input corresponding to the user's second utterance.

In operation 1030, according to an embodiment, when the speech input received from the second electronic device 102 includes no speech corresponding to an operation interruption ("No" in operation 1010), the processor 720 may identify whether the speech input received from the second electronic device 102 includes a speech included in the first response data for the first utterance. For example, when the first response data for the first utterance includes "I'll tell you cafés around the current location," "coffee shop A," "coffee shop B," and "coffee shop C," the processor 720 may identify whether the speech input received from the second electronic device 102 includes a speech of "coffee shop A," "coffee shop B," or "coffee shop C."

In operation 1040, according to an embodiment, when the speech input received from the second electronic device 102 includes a speech included in the first response data for the first utterance ("Yes" in operation 1030), the processor 720 may identify that the speech input received from the second electronic device 102 is the second speech input corresponding to the user's second utterance.

In operation 1050, according to an embodiment, when the speech input received from the second electronic device 102 does not include a speech corresponding to an operation interruption nor a speech included in the first response data for the first utterance ("No" in operation 1030), the processor 720 may identify whether the speech input received from the second electronic device 102 includes a speech corresponding to a demonstrative pronoun. For example, the speech corresponding to a demonstrative pronoun may be a speech indicating "this," "that," or other similar demonstrative pronouns.

In operation 1060, according to an embodiment, when the speech input received from the second electronic device 102 includes a speech corresponding to a demonstrative pronoun ("Yes" in operation 1050), the processor 720 may identify that the speech input received from the second electronic device 102 is the second speech input corresponding to the user's second utterance.

In operation 1070, according to an embodiment, when the speech input received from the second electronic device 102 includes none of a speech corresponding to an operation interruption, a speech included in the first response data for the first utterance, and a speech corresponding to a demonstrative pronoun ("No" in operation 1050), the processor 720 may identify that the speech input received from the second electronic device 102 is not the second speech input corresponding to the user's second utterance.

According to an example embodiment, a method for processing a user utterance by an electronic device (e.g., the intelligent server 200 of FIG. 1 or the intelligent server 700 of FIG. 7) may comprise: transmitting first response data obtained by processing a first speech input corresponding to a first utterance received from a first electronic device (e.g., the first electronic device 101 of FIG. 4) to the first electronic device through a communication module (e.g., the communication module 710 of FIG. 7), identifying a second electronic device (e.g., the second electronic device 102 of FIG. 4) for detecting a second utterance associated with the first response data within a designated time after the first utterance, transmitting a wake-up signal to the second electronic device and receiving, from the second electronic device, a speech input corresponding to an utterance obtained by a turn-on of a microphone based on the wake-up signal, identifying whether the received speech input corresponding to the user utterance is a second speech input corresponding to the second utterance, obtaining second response data obtained by processing the second speech input based on the first speech input and the first response data based on the second speech input corresponding to the second utterance being identified, and transmitting the second response data to at least one of the first electronic device or the second electronic device through the communication module.

According to an example embodiment, the second electronic device may be identified among a plurality of electronic devices associated with the user.

According to an example embodiment, the method may further comprise converting the first speech input into first text data, identifying a first command corresponding to the first speech input by processing the first text data, and obtaining the first response data corresponding to a first plan for performing a first task regarding an execution of the first command.

According to an example embodiment, a wearable electronic device worn by the user of the first utterance among the plurality of electronic devices may be identified as the second electronic device.

According to an example embodiment, a closest electronic device within a designated distance from the user of the first utterance among the plurality of electronic devices may be identified as the second electronic device.

According to an example embodiment, the method may further comprise receiving a plurality of utterances detected as each of the plurality of electronic devices turns on a microphone after a wake-up signal is transmitted to each of the plurality of electronic devices, comparing the plurality of user utterances, and identifying the second electronic device among the plurality of electronic devices.

According to an example embodiment, the speech input corresponding to the user utterance may be identified as the second speech input corresponding to the second utterance based on the speech input corresponding to the user utterance received from the second electronic device including a speech corresponding to an operation interruption.

According to an example embodiment, the speech input corresponding to the user utterance may be identified as the second speech input corresponding to the second utterance based on the speech input corresponding to the user utterance received from the second electronic device including a speech included in the second response data for the first utterance.

According to an example embodiment, the speech input corresponding to the user utterance may be identified as the second speech input corresponding to the second utterance based on the speech input corresponding to the user utterance received from the second electronic device including a speech corresponding to a demonstrative pronoun.

Figure 11:
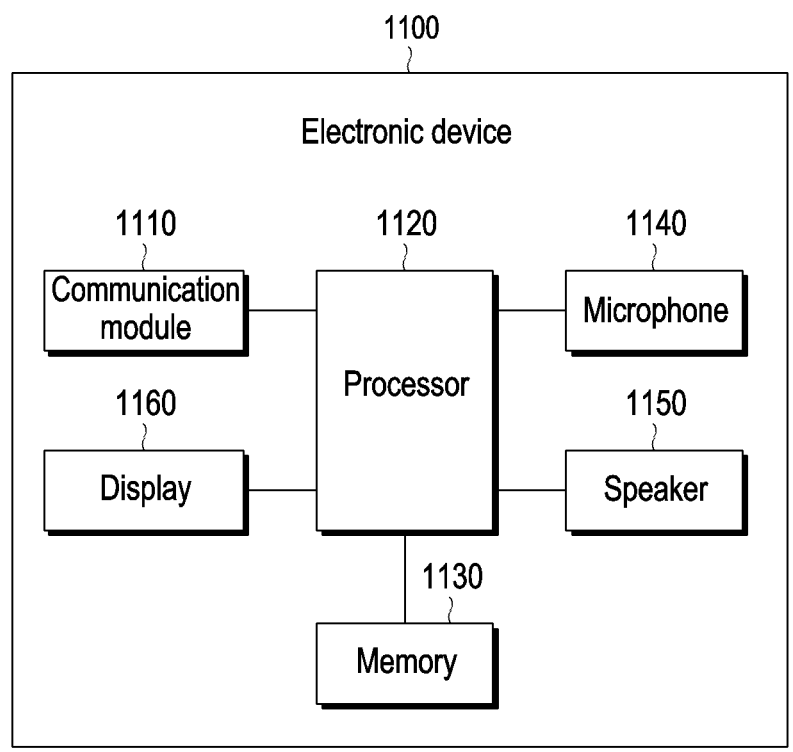
FIG. 11 is a block diagram illustrating an example configuration of an electronic device according to various embodiments.

FIG. 11 is a block diagram illustrating an example configuration of an electronic device according to various embodiments.

Referring to FIG. 11, an electronic device 1100 (e.g., the user terminal 100 of FIG. 1, the first electronic device 101 of FIG. 4, or the second electronic device 102 of FIG. 5) may include a communication module (e.g., including communication circuitry) 1110, a processor (e.g., including processing circuitry) 1120, a memory 1130, a microphone 1140, a speaker 1150, and a display 1160.

According to an embodiment, the communication module 1110 (e.g., the communication interface 110 of FIG. 1) may include various communication circuitry and support an establishment of a direct (e.g., wired) communication channel or wireless communication channel with an external electronic device (e.g., the intelligent server 200) and communication via the established communication channel. The communication module 1110 may include one or more communication processors supporting direct (e.g., wired) communication or wireless communication. According to an embodiment, the communication module 1110 may include a wireless communication module (e.g., a cellular communication module, a short-range wireless communication module, or a global navigation satellite system (GNSS) communication module) or a wired communication module (e.g., a local area network (LAN) communication module or a power line communication (PLC) module).

According to an embodiment, the processor 1120 (e.g., the processor 160 of FIG. 1) may include various processing circuitry and control at least one other component (e.g., a hardware or software component) of the electronic device 1000 connected to the processor 720 and perform various data processing or computation. According to an embodiment, as at least part of data processing or computation, the processor 1120 may operate based on a command or data received from another component (e.g., the communication module 1110).

According to an embodiment, the processor 1120 may obtain a first speech input corresponding to a first user utterance through the microphone 1140 (e.g., the microphone 120 of FIG. 1). For example, the processor 1120 may execute an intelligent app according to a designated input (or a wake-up command) (e.g., "Bixby") and obtain a first speech input (e.g., "Tell me nearby cafés") corresponding to the first speech input from the user through the microphone 1140. According to an embodiment, the processor 1120 may transmit the first speech input to the intelligent server 200. For example, the processor 1120 may convert the first speech input into first text data and transmit it to the intelligent server 200. According to an embodiment, the processor 1120 may receive first response data corresponding to the first speech input from the intelligent server 200. For example, the first response data may include a first plan for performing a first task regarding execution of a first command identified by analyzing the first speech input by the intelligent server 200 or a result of performing an operation according to the first plan. According to an embodiment, the processor 1120 may output the first response data. For example, when the first response data includes the first plan for performing the first task, the processor 1120 may perform an operation according to the first plan and output a sound and/or screen corresponding to the result of performing the operation (e.g., "I'll tell you cafés around the current location, "coffee shop A," "coffee shop B," "coffee shop C") through the speaker 1150 and/or the display 1160. For example, when the first response data includes the result of performing the operation according to the first plan, the processor 1120 may output a sound and/or screen corresponding to the first response data (e.g., "I'll tell you cafés around the current location" "coffee shop A," "coffee shop B," "coffee shop C") through the speaker 1150 and/or the display 1160.

According to an embodiment, the processor 1120 may receive second response data based on the first speech input, the first response data, and the second speech input corresponding to the second utterance obtained by the second electronic device 102, from the intelligent server 200. For example, the processor 1120 may receive, from the intelligent server 200, second response data corresponding to a second plan for performing a second task corresponding to the first speech input, the first response data, and the second speech input corresponding to the second utterance obtained by the second electronic device 102 or a result of performing an operation according to the second plan. For example, the processor 1120 may receive second response data (e.g., "The business hours of coffee shop B are from 9:00 AM to 9:00 PM") corresponding to a second plan for performing a second task regarding execution of a second command (e.g., "Tell me the business hours of coffee shop B") obtained corresponding to the first speech input (e.g., "Tell me nearby cafés"), the first response data (e.g., "I'll tell you cafés around the current location," "coffee shop A," "coffee shop B," "coffee shop C"), and the second speech input (e.g., "Tell me the business hours of that") corresponding to the second utterance obtained by the second electronic device 102 or a result of performing an operation according to the second plan.

According to an embodiment, the processor 1120 may output the second response data. According to an embodiment, when the second response data includes the second plan for performing the second task, the processor 1120 may perform an operation according to the second plan and output a sound and/or screen corresponding to the result of performing the operation (e.g., "The business hours of coffee shop B are from 9:00 AM to 9:00 PM") through the speaker 1150 and/or the display 1160. For example, when the second response data includes the result of performing the operation according to the second plan, the processor 1120 may output a sound and/or screen corresponding to the second response data (e.g., "The business hours of coffee shop B are from 9:00 AM to 9:00 PM") through the speaker 1150 and/or the display 1160.

According to an embodiment, the processor 1120 may receive a control signal (e.g., a wake-up signal) for controlling to detect the user's utterance from the intelligent server 200 through the communication module 1110. According to an embodiment, the processor 1120 may execute an intelligent app in response to reception of a wake-up signal from the intelligent server 200, instead of a designated user input (or a wake-up command) (e.g., "Bixby"), obtain a speech input corresponding to the user utterance through the microphone 1140, and transmit the obtained speech input to the intelligent server 200. According to an embodiment, the processor 1120 may receive the first speech input (e.g., "Tell me nearby cafés") and first response data (e.g., "I'll tell you cafés around the current location," "coffee shop A," "coffee shop B," "coffee shop C") from the intelligent server 200. According to an embodiment, the processor 1120 may identify whether the obtained speech input (e.g., "Tell me the business hours of that") is the second speech input corresponding to the user's second utterance. For example, when the obtained speech input (e.g., "Tell me the business hours of that") corresponding to the user utterance is a speech input associated with the first speech input response session, the processor 1120 may identify that the obtained speech input (e.g., "Tell me the business hours of that") corresponding to the user utterance is the second speech input corresponding to the user's second utterance. For example, when the obtained speech input (e.g., "Tell me the business hours of that") corresponding to the user utterance is received within a designated time after receiving the first speech input (e.g., "Tell me nearby cafés") corresponding to the user's first utterance and is a speech input associated with the first response data (e.g., "I'll tell you cafés around the current location," "coffee shop A," "coffee shop B," "coffee shop C"), the processor 1120 may identify that the speech input (e.g., "Tell me the business hours of that")

received from the second electronic device 102 is the second speech input corresponding to the user's second utterance. According to an embodiment, the processor 1120 may transmit the identified second speech input corresponding to the user speech to the intelligent server 200.

According to an embodiment, the memory 1130 (e.g., the memory 150 of FIG. 1) may store instructions which, when executed, cause the processor 1120 to perform or control the electronic device 110 to perform various operations described above and information or data associated with the instructions.

According to an embodiment, the microphone 1140 (e.g., the microphone 120 of FIG. 1) may detect the user's utterance and receive a speech signal corresponding to the user's utterance. For example, the microphone 1140 may include a speech input system that operates based on the control of the processor 1120 and may receive a speech signal corresponding to the user's utterance through the speech input system.

According to an embodiment, the speaker 1150 (e.g., the speaker 130 of FIG. 1) may output at least one sound based on the control of the processor 1120. For example, the speaker 1150 may output a sound corresponding to the response data (e.g., the first response data or the second response data) generated inside the electronic device 1100 based on the control of the processor 1120 or received from the outside (e.g., the intelligent server 200) via communication.

According to an embodiment, the display 1160 (e.g., the display 140 of FIG. 1) may turn on at least one or more lighting devices or display an image based on the control of the processor 1120. For example, the display 1160 may turn on at least one or more lighting devices or display an image corresponding to the response data (e.g., the first response data or second response data) received via communication from the outside (e.g., the intelligent server 200) or generated inside the electronic device 1100 based on the control of the processor 1120.

Figure 12:
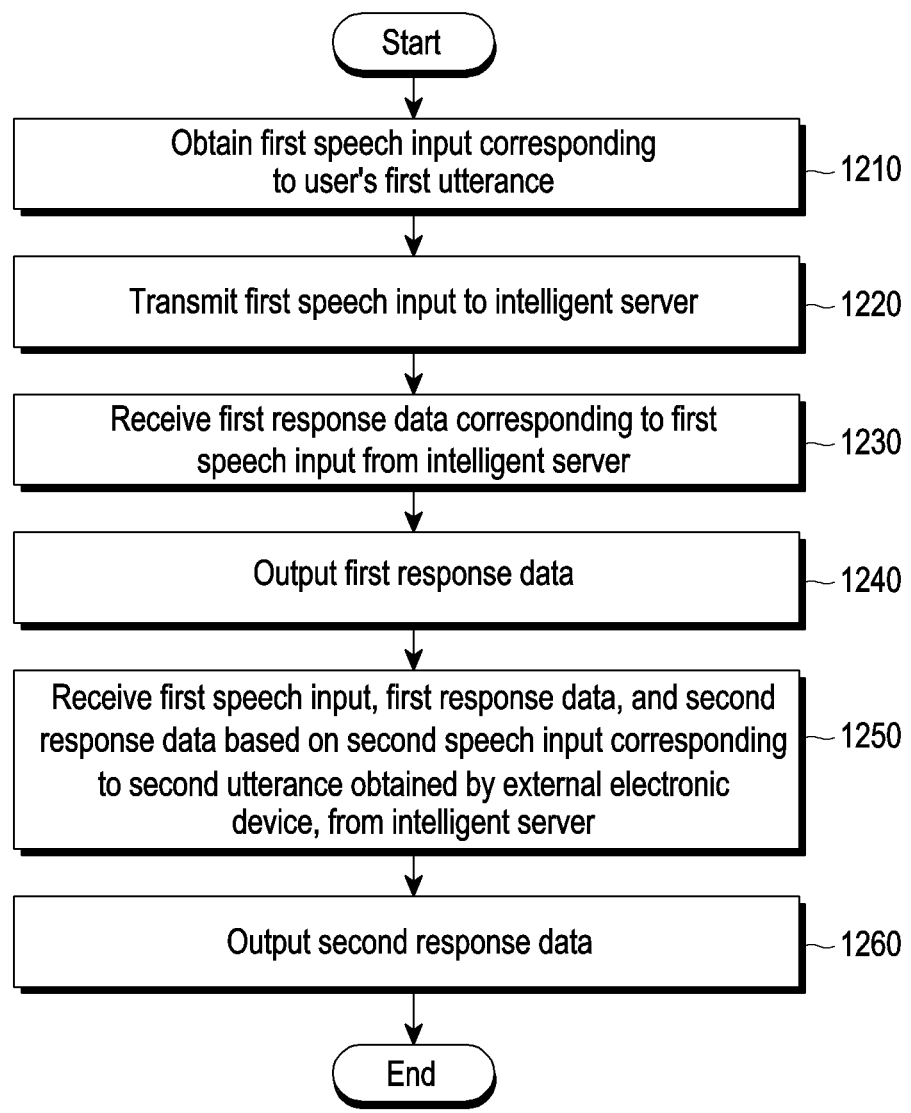
FIG. 12 is a flowchart illustrating an example operation of outputting a first speech input obtained from an electronic device, first response data corresponding to the first speech input, and second response data based on a second speech input obtained from an external electronic device, according to various embodiments.

FIG. 12 is a flowchart illustrating an example operation of outputting a first speech input obtained from an electronic device, first response data corresponding to the first speech input, and second response data based on a second speech input obtained from an external electronic device, according to various embodiments.

Referring to FIG. 12, according to an embodiment, a processor 1120 (e.g., the processor 160 of FIG. 1) of an electronic device 1100 (e.g., the user terminal 100 of FIG. 1) may perform at least one of operations 1210 to 1260. For example, operations 1210 to 1260 may regard a case in which the electronic device 1100 operates as the first electronic device 101.

In operation 1210, according to an embodiment, the processor 1120 may obtain a first speech input corresponding to a first user utterance through the microphone 1140 (e.g., the microphone 120 of FIG. 1). For example, the processor 1120 may execute an intelligent app according to a designated input (or a wake-up command) (e.g., "Bixby") and obtain a first speech input (e.g., "Tell me nearby cafés") corresponding to the first speech input from the user through the microphone 120.

In operation 1220, according to an embodiment, the processor 1120 may transmit the first speech input to the intelligent server 200. For example, the processor 1120 may convert the first speech input into first text data and transmit it to the intelligent server 200.

In operation 1230, according to an embodiment, the processor 1120 may receive first response data corresponding to the first speech input from the intelligent server 200. For example, the first response data may include a first plan for performing a first task regarding execution of a first command identified by analyzing the first speech input (e.g., "Tell me nearby cafés") by the intelligent server 200 or a result (e.g., "I'll tell you cafés around the current location," "coffee shop A," "coffee shop B," "coffee shop C") of performing an operation according to the first plan.

In operation 1240, according to an embodiment, the processor 1120 may output the first response data. For example, when the first response data includes the first plan for performing the first task, the processor 1120 may perform an operation according to the first plan and output a sound and/or screen corresponding to the result of performing the operation (e.g., "I'll tell you cafés around the current location, "coffee shop A," "coffee shop B," "coffee shop C") through the speaker 1150 and/or the display 1160. For example, when the first response data includes the result of performing the operation according to the first plan, the processor 1120 may output a sound and/or screen corresponding to the first response data (e.g., "I'll tell you cafés around the current location" "coffee shop A," "coffee shop B," "coffee shop C") through the speaker 1150 and/or the display 1160.

In operation 1250, according to an embodiment, the processor 1120 may receive second response data based on the first speech input, the first response data, and the second speech input corresponding to the second utterance obtained by an external electronic device (e.g., the second electronic device 102), from the intelligent server 200. For example, the processor 1120 may receive, from the intelligent server 200, second response data corresponding to a second plan for performing a second task corresponding to the first speech input, the first response data, and the second speech input corresponding to the second utterance obtained by the second electronic device 102 or a result of performing an operation according to the second plan. For example, the processor 1120 may receive second response data (e.g., "The business hours of coffee shop B are from 9:00 AM to 9:00 PM") corresponding to a second plan for performing a second task regarding execution of a second command (e.g., "Tell me the business hours of coffee shop B") obtained corresponding to the first speech input (e.g., "Tell me nearby cafés"), the first response data (e.g., "I'll tell you cafés around the current location," "coffee shop A," "coffee shop B," "coffee shop C"), and the second speech input (e.g., "Tell me the business hours of that") corresponding to the second utterance obtained by the second electronic device 102 or a result of performing an operation according to the second plan.

In operation 1260, according to an embodiment, the processor 1120 may output the second response data. For example, when the second response data includes the second plan for performing the second task, the processor 1120 may perform an operation according to the second plan and output a sound and/or screen corresponding to the result of performing the operation (e.g., "The business hours of coffee shop B are from 9:00 AM to 9:00 PM") through the speaker 1150 and/or the display 1160. For example, when the second response data includes the result of performing the operation according to the second plan, the processor 1120 may output a sound and/or screen corresponding to the second response data (e.g., "The business hours of coffee shop B are from 9:00 AM to 9:00 PM") through the speaker 1150 and/or the display 1160.

Figure 13:
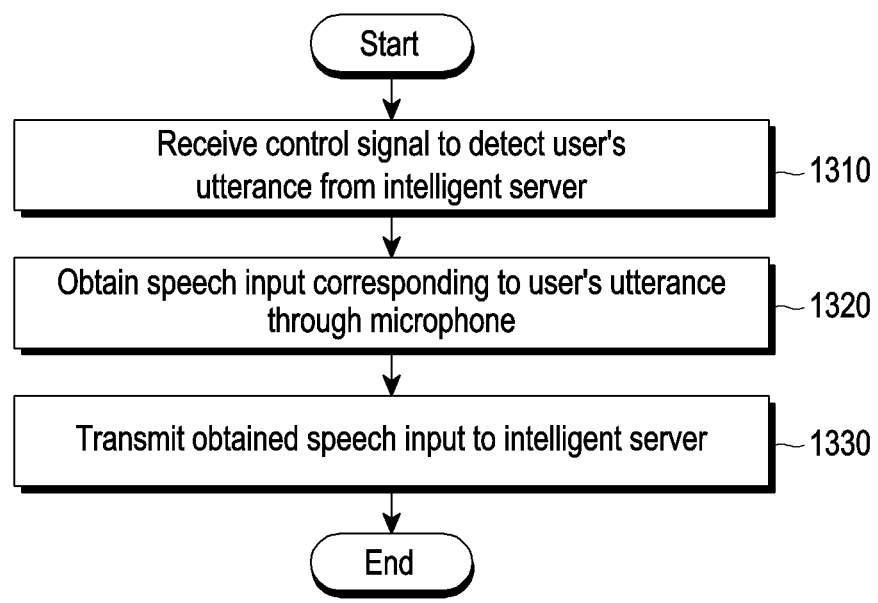
FIG. 13 is a flowchart illustrating an example operation of obtaining a speech input based on a control signal to control a user utterance from an intelligent server, by an electronic device, according to various embodiments.

FIG. 13 is a flowchart illustrating an example operation of obtaining a speech input based on a control signal to control a user utterance from an intelligent server, by an electronic device, according to various embodiments.

Referring to FIG. 13, according to an embodiment, a processor 1120 (e.g., the processor 160 of FIG. 1) of an electronic device 1100 (e.g., the user terminal 100 of FIG. 1) may perform at least one of operations 1310 to 1350. For example, operations 1310 to 1330 may regard a case in which the electronic device 1100 operates as the second electronic device 102.

In operation 1310, according to an embodiment, the processor 1120 may receive a control signal (e.g., a wake-up signal) for controlling the electronic device 1100 to detect the user's utterance from the intelligent server 200 through the communication module 1110.

In operation 1320, according to an embodiment, the processor 1120 may obtain a speech input corresponding to the user utterance through the microphone 1140 in response to reception of a control signal (e.g., a wake-up signal) for controlling to detect the user's utterance. For example, the processor 1120 may execute an intelligent app in response to reception of a wake-up signal from the intelligent server 200, instead of a designated user input (or a wake-up command) (e.g., "Bixby") and obtain a speech input corresponding to the user utterance through the microphone 1140.

In operation 1330, according to an embodiment, the processor 1120 may transmit the obtained speech input to the intelligent server 200. For example, the processor 1120 may transmit the obtained speech input, as it is, to the intelligent server or may identify whether the obtained speech input is a speech input that is received within a designated time after receiving the first speech input corresponding to the user's first utterance and is associated with the first response data, e.g., whether the speech input is the second speech input corresponding to the user's second utterance, and transmit the identified second speech input corresponding to the user's second utterance to the intelligent server 200. For example, the processor 1120 may receive the first speech input (e.g., "Tell me nearby cafés") and first response data (e.g., "I'll tell you cafés around the current location," "coffee shop A," "coffee shop B," "coffee shop C") from the intelligent server 200. For example, when the obtained speech input (e.g., "Tell me the business hours of that") corresponding to the user utterance is a speech input associated with the first speech input response session, the processor 1120 may identify that the obtained speech input (e.g., "Tell me the business hours of that") corresponding to the user utterance is the second speech input corresponding to the user's second utterance. For example, when the obtained speech input (e.g., "Tell me the business hours of that") corresponding to the user utterance is received within a designated time after receiving the first speech input (e.g., "Tell me nearby cafés") corresponding to the user's first utterance and is a speech input associated with the first response data (e.g., "I'll tell you cafés around the current location," "coffee shop A," "coffee shop B," "coffee shop C"), the processor 1120 may identify that the speech input (e.g., "Tell me the business hours of that") received from the second electronic device 102 is the second speech input corresponding to the user's second utterance. According to an embodiment, the processor 1120 may transmit the identified second speech input corresponding to the user speech to the intelligent server 200.

Figure 14:
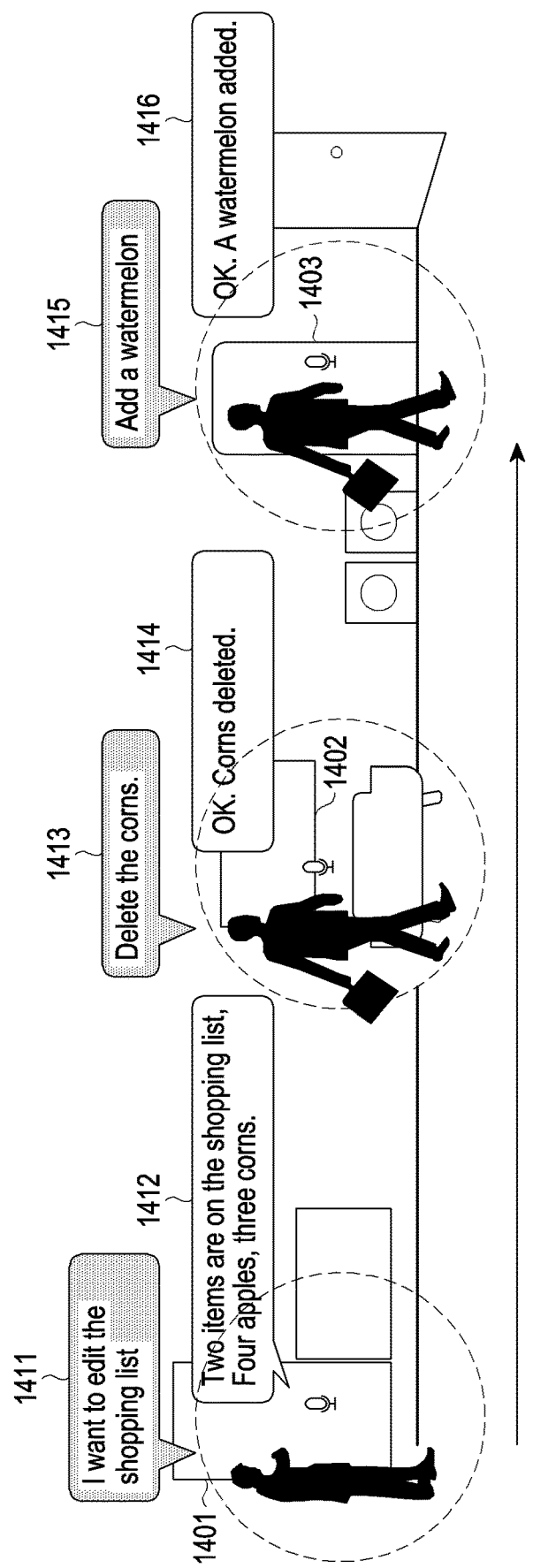
FIG. 14 is a diagram illustrating an example of detecting an utterance associated with a shopping list and outputting response data associated with the shopping list using a first electronic device, a second electronic device, and a third electronic device according to various embodiments.

FIG. 14 is a diagram illustrating an example of detecting an utterance associated with a shopping list and outputting response data associated with the shopping list using a first electronic device, a second electronic device, and a third electronic device according to various embodiments.

Referring to FIG. 14, according to an embodiment, a first electronic device 1401 (e.g., the user terminal 100 of FIG. 1, or the first electronic device 101 of FIG. 4) (or a first processor of the first electronic device 1401) may obtain a first speech input corresponding to a first user utterance through a microphone (e.g., the microphone 120 of FIG. 1 or the microphone 1150 of FIG. 11). For example, the first electronic device 1401 may execute an intelligent app according to a designated input (or a wake-up command) (e.g., "Bixby") and obtain a first speech input (e.g., "I want to edit the shopping list") corresponding to the first speech input from the user through the microphone.

According to an embodiment, the first electronic device 1401 may transmit the first speech input (e.g., "I want to edit the shopping list") 1411 corresponding to the first user utterance from the user to the intelligent server 200. For example, the processor 1120 may convert the first speech input 1411 into first text data and transmit it to the intelligent server 200.

According to an embodiment, the first electronic device 1401 may receive first response data corresponding to the first speech input 1411 from the intelligent server 200. For example, the first response data 1412 may include a first plan for performing a first task regarding execution of a first command identified by analyzing the first speech input (e.g., "I want to edit the shopping list") 1411 by the intelligent server 200 or a result (e.g., "Two items are on the shopping list," "four applies," "three corns") of performing an operation according to the first plan. According to an embodiment, the first electronic device 1401 may output the first response data 1412 (e.g., "Two items are on the shopping list," "four applies," "three corns").

According to an embodiment, the second electronic device 1402 (e.g., the user terminal 100 of FIG. 1 or the second electronic device 102 of FIG. 4) (or a second processor of the second electronic device 1402) may receive a control signal (e.g., a wake-up signal) for controlling to detect the user's utterance from the intelligent server 200. For example, the second electronic device 1402 may be identified as an electronic device for obtaining a speech input that is received within a designated time after receiving the first speech input 1411 corresponding to the user's first utterance by the intelligent server 200 and is associated with the first response data 1412, e.g., the second speech input corresponding to the user's second utterance and, as it is identified as an electronic device for obtaining the second speech input corresponding to the user's second utterance, it may receive a control signal (e.g., a wake-up signal) for controlling to detect the user's utterance.

According to an embodiment, the second electronic device 1402 may execute an intelligent app in response to reception of the wake-up signal from the intelligent server 200, instead of a designated user input (or a wake-up command) (e.g., "Bixby") and obtain a speech input 1413 (e.g., "Delete the corns") corresponding to the user utterance through the microphone. According to an embodiment, the second electronic device 1402 may transmit the obtained speech input 1413 (e.g., "Delete the corns") to the intelligent server 200 or may identify whether the obtained speech input is a speech input that is received within a designated time after receiving the first speech input corresponding to the user's first utterance and is associated with the first response data, e.g., whether the speech input is the second speech input corresponding to the user's second utterance, and transmit the identified second speech input 1413 (e.g., "Delete the corns") corresponding to the user's second utterance to the intelligent server 200.

According to an embodiment, the second electronic device 1402 (or the first electronic device 1401) may receive, from the intelligent server 200, second response data 1414 (e.g., "Ok. Corns deleted") based on the first speech input 1411 (e.g., "I want to edit the shopping list"), the first response data 1412 (e.g., "Two items are on the shopping list," "four applies," "three corns") and the second speech input 1413 (e.g., "Delete the corns") corresponding to the second utterance obtained by the second electronic device 1402. For example, the second electronic device 1402 may receive, from the intelligent server 200, second response data 1414 corresponding to a second plan for performing a second task corresponding to the first speech input 1411, the first response data 1412, and the second speech input 1413 corresponding to the second utterance obtained by the second electronic device 1402 or a result of performing an operation according to the second plan. According to an embodiment, the second electronic device 1402 may output the second response data 1414 (e.g., "Ok. Corns deleted").

According to an embodiment, a third electronic device 1403 (e.g., the user terminal 100 of FIG. 1 or the Nth electronic device 103 of FIG. 4) (or a third processor of the third electronic device 1403) may receive a control signal (e.g., a wake-up signal) for controlling to detect the user's utterance from the intelligent server 200. For example, the third electronic device 1403 may be identified as an electronic device for obtaining a speech input that is received within a designated time after receiving the second speech input 1413 corresponding to the user's second utterance by the intelligent server 200 and is associated with the second response data 1414, e.g., the third speech input corresponding to the user's third utterance and, as it is identified as an electronic device for obtaining the third speech input corresponding to the user's third utterance, it may receive a control signal (e.g., a wake-up signal) for controlling to detect the user's utterance.

According to an embodiment, the third electronic device 1403 may execute an intelligent app in response to reception of the wake-up signal from the intelligent server 200, instead of a designated user input (or a wake-up command) (e.g., "Bixby") and obtain a speech input 1415 (e.g., "Add a watermelon") corresponding to the user utterance through the microphone. According to an embodiment, the third electronic device 1403 may transmit the obtained speech input 1415 (e.g., "Add a watermelon") to the intelligent server 200 or may identify whether the obtained speech input is a speech input that is received within a designated time after receiving the second speech input corresponding to the user's second utterance and is associated with the second response data, e.g., whether the speech input is the third speech input corresponding to the user's third utterance, and transmit the identified third speech input 1415 (e.g., "Add a watermelon") corresponding to the user's third utterance to the intelligent server 200.

According to an embodiment, the third electronic device 1403 (or the second electronic device 1402) may receive, from the intelligent server 200, third response data 1416 (e.g., "Ok. A watermelon added") corresponding to the first speech input 1411 (e.g., "I want to edit the shopping list"), the first response data 1412 (e.g., "Two items are on the shopping list," "four apples," "three corns"), the second speech input 1413 (e.g., "Delete the corns"), the second response data 1414 (e.g., "Ok. Corns deleted"), and the third speech input 1415 (e.g., "Add a watermelon"). For example, the third electronic device 1403 may receive, from the intelligent server 200, the third response data 1416 corresponding to a second plan for performing a second task corresponding to the first speech input 1411, the first response data 1412, the second speech input 1413, the second response data 1414, and the third speech input 1415 or a result of performing an operation according to the second plan. According to an embodiment, the third electronic device 1403 may output the third response data 1416 (e.g., "Ok. A watermelon added").

Figure 15:
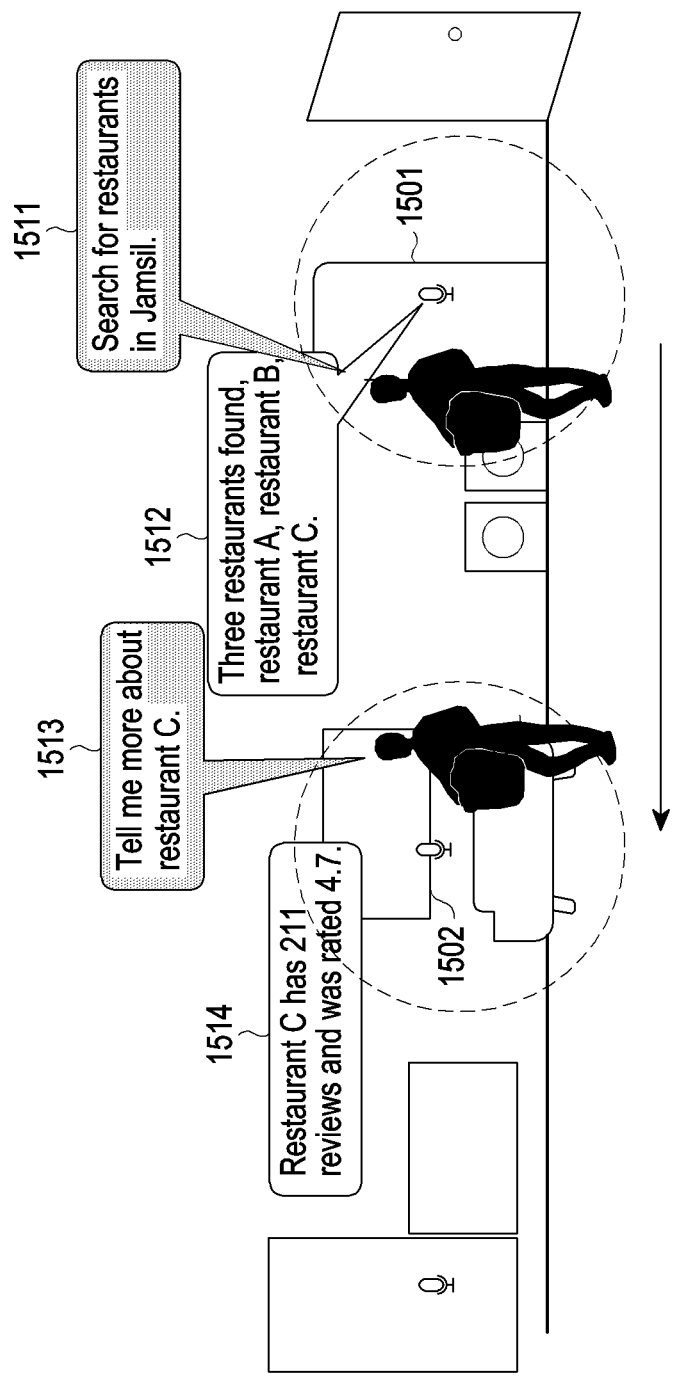
FIG. 15 is a diagram illustrating an example of detecting an utterance associated with searching for restaurants and outputting response data associated with the restaurant search using a first electronic device and a second electronic device according to various embodiments.

FIG. 15 is a diagram illustrating an example of detecting an utterance associated with searching for restaurants and outputting response data associated with the restaurant search using a first electronic device and a second electronic device according to various embodiments.

Referring to FIG. 15, according to an embodiment, a first electronic device 1501 (e.g., the user terminal 100 of FIG. 1, or the first electronic device 101 of FIG. 4) (or a first processor of the first electronic device 1501) may obtain a first speech input corresponding to a first user utterance through a microphone (e.g., the microphone 120 of FIG. 1 or the microphone 1150 of FIG. 11). For example, the first electronic device 1501 may execute an intelligent app according to a designated input (or a wake-up command) (e.g., "Bixby") and obtain a first speech input 1511 (e.g., "Search for restaurants in Jamsil") corresponding to the first speech input from the user through the microphone.

According to an embodiment, the first electronic device 1501 may transmit the first speech input (e.g., "Search for restaurants in Jamsil") 1511 corresponding to the first user utterance from the user to the intelligent server 200. For example, the processor 1120 may convert the first speech input 1511 into first text data and transmit it to the intelligent server 200.

According to an embodiment, the first electronic device 1501 may receive first response data corresponding to the first speech input 1511 from the intelligent server 200. For example, the first response data 1512 may include a first plan for performing a first task regarding execution of a first command identified by analyzing the first speech input (e.g., "Search for restaurants in Jamsil") 1511 by the intelligent server 200 or a result (e.g., "Three restaurants found," "restaurant A," "restaurant B," "restaurant C") of performing an operation according to the first plan. According to an embodiment, the first electronic device 1501 may output the first response data 1512 (e.g., "Three restaurants found," "restaurant A," "restaurant B," "restaurant C").

According to an embodiment, the second electronic device 1502 (e.g., the user terminal 100 of FIG. 1 or the second electronic device 102 of FIG. 4) (or a second processor of the second electronic device 1502) may receive a control signal (e.g., a wake-up signal) for controlling to detect the user's utterance from the intelligent server 200. For example, the second electronic device 1502 may be identified as an electronic device for obtaining a speech input that is received within a designated time after receiving the first speech input 1511 corresponding to the user's first utterance by the intelligent server 200 and is associated with the first response data 1512, e.g., the second speech input corresponding to the user's second utterance and, as it is identified as an electronic device for obtaining the second speech input corresponding to the user's second utterance, it may receive a control signal (e.g., a wake-up signal) for controlling to detect the user's utterance.

According to an embodiment, the second electronic device 1502 may execute an intelligent app in response to reception of the wake-up signal from the intelligent server 200, instead of a designated user input (or a wake-up command) (e.g., "Bixby") and obtain a speech input 1513

(e.g., "Tell me more about restaurant C") corresponding to the user utterance through the microphone. According to an embodiment, the second electronic device 1502 may transmit the obtained speech input 1513 (e.g., "Tell me more about restaurant C") to the intelligent server 200 or may identify whether the obtained speech input is a speech input that is received within a designated time after receiving the first speech input corresponding to the user's first utterance and is associated with the first response data, e.g., whether the speech input is the second speech input corresponding to the user's second utterance, and transmit the identified second speech input 1513 (e.g., "Tell me more about restaurant C") corresponding to the user's second utterance to the intelligent server 200.

According to an embodiment, the second electronic device 1502 (or the first electronic device 1501) may receive, from the intelligent server 200, second response data 1514 (e.g., "Restaurant C has 211 reviews and was rated 4.7") based on the first speech input 1511 (e.g., "Search for restaurants in Jamsil"), the first response data 1512 (e.g., "Three restaurants found," "restaurant A," "restaurant B," "restaurant C") and the second speech input 1513 (e.g., "Restaurant C has 211 reviews and was rated 4.7") corresponding to the second utterance obtained by the second electronic device 1502. For example, the second electronic device 1502 may receive, from the intelligent server 200, second response data 1514 corresponding to a second plan for performing a second task corresponding to the first speech input 1511, the first response data 1512, and the second speech input 1513 corresponding to the second utterance obtained by the second electronic device 1502 or a result of performing an operation according to the second plan. According to an embodiment, the second electronic device 1502 may output the second response data 1514 (e.g., "Restaurant C has 211 reviews and was rated 4.7").

Figure 16:
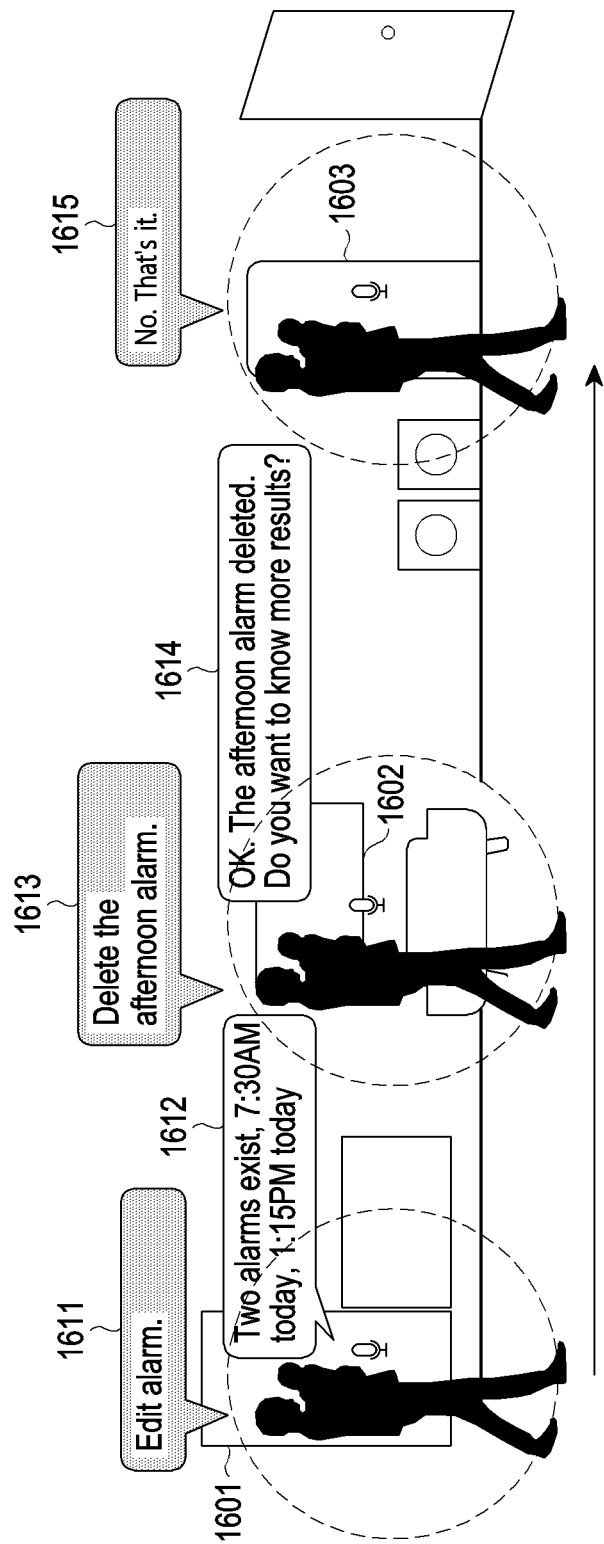
FIG. 16 is a diagram illustrating an example of detecting an utterance associated with an alarm setting and outputting response data associated with the alarm setting using a first electronic device, a second electronic device, and a third electronic device according to various embodiments.

FIG. 16 is a diagram illustrating an example of detecting an utterance associated with an alarm setting and outputting response data associated with the alarm setting using a first electronic device, a second electronic device, and a third electronic device according to various embodiments.

Referring to FIG. 16, according to an embodiment, a first electronic device 1601 (e.g., the user terminal 100 of FIG. 1, or the first electronic device 101 of FIG. 4) (or a first processor of the first electronic device 1601) may obtain a first speech input corresponding to a first user utterance through a microphone (e.g., the microphone 120 of FIG. 1 or the microphone 1150 of FIG. 11). For example, the first electronic device 1601 may execute an intelligent app according to a designated input (or a wake-up command) (e.g., "Bixby") and obtain a first speech input 1611 (e.g., "Edit alarm") corresponding to the first speech input from the user through the microphone.

According to an embodiment, the first electronic device 1601 may transmit the first speech input 1611 (e.g., "Edit alarm") corresponding to the first user utterance from the user to the intelligent server 200. For example, the first electronic device 1601 may convert the first speech input 1611 into first text data and transmit it to the intelligent server 200.

According to an embodiment, the first electronic device 1601 may receive first response data corresponding to the first speech input 1611 from the intelligent server 200. For example, the first response data 1612 may include a first plan for performing a first task regarding execution of a first command identified by analyzing the first speech input 1611 (e.g., "Edit alarm") by the intelligent server 200 or a result (e.g., "Two alarms exist," "7:30 AM today," "1:15 PM today") of performing an operation according to the first plan. According to an embodiment, the first electronic device 1601 may output the first response data 1612 (e.g., "Two alarms exist," "7:30 AM today," "1:15 PM today").

According to an embodiment, the second electronic device 1602 (e.g., the user terminal 100 of FIG. 1 or the second electronic device 102 of FIG. 4) (or a second processor of the second electronic device 1602) may receive a control signal (e.g., a wake-up signal) for controlling to detect the user's utterance from the intelligent server 200. For example, the second electronic device 1602 may be identified as an electronic device for obtaining a speech input that is received within a designated time after receiving the first speech input 1611 corresponding to the user's first utterance by the intelligent server 200 and is associated with the first response data 1612, e.g., the second speech input corresponding to the user's second utterance and, as it is identified as an electronic device for obtaining the second speech input corresponding to the user's second utterance, it may receive a control signal (e.g., a wake-up signal) for controlling to detect the user's utterance.

According to an embodiment, the second electronic device 1602 may execute an intelligent app in response to reception of the wake-up signal from the intelligent server 200, instead of a designated user input (or a wake-up command) (e.g., "Bixby") and obtain a speech input 1613 (e.g., "Delete the afternoon alarm") corresponding to the user utterance through the microphone. According to an embodiment, the second electronic device 1602 may transmit the obtained speech input 1613 (e.g., "Delete the afternoon alarm") to the intelligent server 200 or may identify whether the obtained speech input is a speech input that is received within a designated time after receiving the first speech input corresponding to the user's first utterance and is associated with the first response data, e.g., whether the speech input is the second speech input corresponding to the user's second utterance, and transmit the identified second speech input 1613 (e.g., "Delete the afternoon alarm") corresponding to the user's second utterance to the intelligent server 200.

According to an embodiment, the second electronic device 1602 (or the first electronic device 1601) may receive, from the intelligent server 200, second response data 1614 (e.g., "Ok. The afternoon alarm deleted," "Do you want to know more results") based on the first speech input 1611 (e.g., "Edit alarm"), the first response data 1612 (e.g., "Two alarms exist," "7:30 AM today," "1:15 PM today") and the second speech input 1613 (e.g., "Delete the afternoon alarm") corresponding to the second utterance obtained by the second electronic device 1602. For example, the second electronic device 1602 may receive, from the intelligent server 200, second response data 1614 corresponding to a second plan for performing a second task corresponding to the first speech input 1611, the first response data 1612, and the second speech input 1613 corresponding to the second utterance obtained by the second electronic device 1602 or a result of performing an operation according to the second plan. According to an embodiment, the second electronic device 1602 may output the second response data 1614 (e.g., "Ok. The afternoon alarm deleted," "Do you want to know more results").

According to an embodiment, a third electronic device 1603 (e.g., the user terminal 100 of FIG. 1 or the Nth electronic device 103 of FIG. 4) (or a third processor of the third electronic device 1603) may receive a control signal (e.g., a wake-up signal) for controlling to detect the user's utterance from the intelligent server 200. For example, the third electronic device 1603 may be identified as an electronic device for obtaining a speech input that is received within a designated time after receiving the second speech input 1613 corresponding to the user's second utterance by the intelligent server 200 and is associated with the second response data 1614, e.g., the third speech input corresponding to the user's third utterance and, as it is identified as an electronic device for obtaining the third speech input corresponding to the user's third utterance, it may receive a control signal (e.g., a wake-up signal) for controlling to detect the user's utterance.

According to an embodiment, the third electronic device 1603 may execute an intelligent app in response to reception of the wake-up signal from the intelligent server 200, instead of a designated user input (or a wake-up command) (e.g., "Bixby") and obtain a speech input 1615 (e.g., "No. That's it") corresponding to the user utterance through the microphone. According to an embodiment, the third electronic device 1603 may transmit the obtained speech input 1615 (e.g., "No. That's it") to the intelligent server 200 or may identify whether the obtained speech input is a speech input that is received within a designated time after receiving the second speech input corresponding to the user's second utterance and is associated with the second response data, e.g., whether the speech input is the third speech input corresponding to the user's third utterance, and transmit the identified third speech input 1615 (e.g., "No. That's it") corresponding to the user's third utterance to the intelligent server 200.

According to an embodiment, the third electronic device 1603 (or the second electronic device 1602) may receive, from the intelligent server 200, third response data 1616 corresponding to the first speech input 1611 (e.g., "Edit alarm"), the first response data 1612 (e.g., "Two alarm exist," "7:30 AM today," "1:15 PM today"), the second speech input 1613 (e.g., "Delete the afternoon alarm"), the second response data 1614 (e.g., "The afternoon alarm deleted," "Do you want to know more results"), and the third speech input 1615 (e.g., "No. That's it"). For example, the third electronic device 1603 may receive, from the intelligent server 200, the third response data 1616 corresponding to a second plan for performing a second task corresponding to the first speech input 1611, the first response data 1612, the second speech input 1613, the second response data 1614, and the third speech input 1615 or a result of performing an operation according to the second plan. According to an embodiment, the third electronic device 1603 may terminate the speech input reception based on the third response data 1616.

Figure 17:
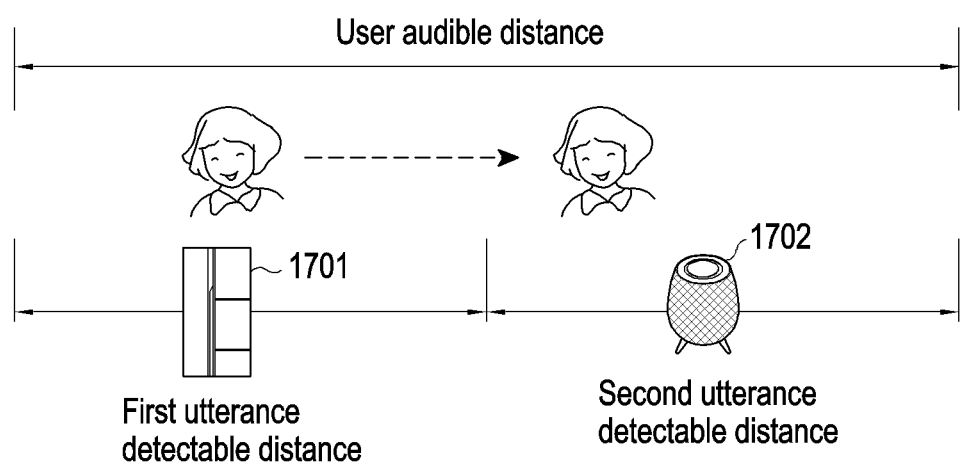
FIG. 17 is a diagram illustrating a user's audible distance, a first utterance detection distance of a first electronic device and a second utterance detection distance of a second electronic device according to various embodiments.

FIG. 17 is a diagram illustrating examples of a user's audible distance, a first utterance detection distance of a first electronic device and a second utterance detection distance of a second electronic device according to various embodiments.

Referring to FIG. 17, according to an embodiment, a first utterance detectable distance of a first electronic device 1701 (e.g., the first electronic device 101 of FIG. 4) and a second utterance detectable distance of a second electronic device 1702 (e.g., the second electronic device 102 of FIG. 4) may be shorter than the user's audible distance. In the case where utterance detection is performed only with the first electronic device 1701, if the user makes a first utterance through the first electronic device 1701 (or receives a first response to a first speech input of the first utterance) and then moves out of the first utterance detectable distance and makes a second utterance within the second utterance detectable distance, the speech recognition service for the second utterance may not be provided. According to an embodiment, when the user moves out of the first utterance detectable distance and makes the second utterance within the second utterance detectable distance after making the first utterance through the first electronic device 1701 (or after receiving the first response to the first speech input of the first utterance), the intelligent server 200 may activate the microphone of the second electronic device 1702 to detect the second utterance, thereby allowing the speech recognition service to be seamlessly provided.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, a module may be implemented in the form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an example embodiment, there may be provided a non-transitory computer readable storage medium storing instructions, the instructions configured to be executed by at least one processor, and when executed cause an electronic device to perform at least one operation, the at least one operation comprising: transmitting first response data obtained by processing a first speech input corresponding to a first utterance received from a first electronic device to the first electronic device through a communication module, identifying a second electronic device configured to detect a second utterance associated with the first response data within a designated time after the first utterance, transmitting a wake-up signal to the second electronic device and receiving, from the second electronic device, a speech input corresponding to an utterance obtained by a turn-on of a microphone based on the wake-up signal, identifying whether the received speech input corresponding to the utterance is a second speech input corresponding to the second utterance, obtaining second response data obtained by processing the second speech input based on the first speech input and the first response data based on the second speech input corresponding to the second utterance being identified, and transmitting the second response data to the first electronic device or the second electronic device through the communication module.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device, comprising:
communication circuitry;
a memory; and
at least one processor, wherein the memory stores instructions which, when executed, cause the at least one processor to control the electronic device to:
transmit, to a first electronic device through the communication module, first response data obtained by processing a first speech input corresponding to a first utterance received from the first electronic device;
identify a second electronic device including circuitry configured to detect a second utterance associated with the first response data within a designated time after the first utterance;
transmit a wake-up signal to the second electronic device;
receive, from the second electronic device, a speech input corresponding to an utterance obtained by a microphone turned on based on the wake-up signal;
identify whether the received speech input corresponding to the utterance is a second speech input corresponding to the second utterance;
obtain second response data obtained by processing the second speech input based on the first speech input and the first response data in response to identifying that the received speech input corresponding to the utterance is the second speech input corresponding to the second utterance; and
transmit the second response data to at least one of the first electronic device or the second electronic device through the communication module.

2. The electronic device of claim 1, wherein the at least one processor is configured to identify the second electronic device among a plurality of electronic devices associated with a user.

3. The electronic device of claim 2, wherein the at least one processor is configured to control the electronic device to: convert the first speech input into first text data, identify a first command corresponding to the first speech input by processing the first text data, and obtain the first response data corresponding to a first plan for performing a first task associated with an execution of the first command.

4. The electronic device of claim 2, wherein the at least one processor is configured to identify that a wearable electronic device worn by the user of the first utterance among the plurality of electronic devices is the second electronic device.

5. The electronic device of claim 2, wherein the at least one processor is configured to identify that an electronic device within a designated distance from the user of the first utterance among the plurality of electronic devices is the second electronic device.

6. The electronic device of claim 2, wherein the at least one processor is configured to control the electronic device to: transmit wake-up signals to the plurality of electronic devices respectively, receive a plurality of utterances detected by each of the plurality of electronic devices from a microphone turned on based on the wake-up signals, and identify the second electronic device among the plurality of electronic devices based on comparing the plurality of utterances.

7. The electronic device of claim 1, wherein the at least one processor is configured to identify that the speech input corresponding to the utterance is the second speech input corresponding to the second utterance based on identifying that the speech input corresponding to the utterance received from the second electronic device includes a speech corresponding to an operation interruption.

8. The electronic device of claim 1, wherein the at least one processor is configured to identify that the speech input corresponding to the utterance is the second speech input corresponding to the second utterance based on identifying that the speech input corresponding to the utterance received from the second electronic device includes a speech included in the second response data for the first utterance.

9. The electronic device of claim 1, wherein the at least one processor is configured to identify that the speech input corresponding to the utterance is the second speech input corresponding to the second utterance based on identifying that the speech input corresponding to the utterance received from the second electronic device includes a speech corresponding to a demonstrative pronoun.

10. A method of operating an electronic device to process an utterance, the method comprising:
    transmitting, to a first electronic device through a communication module, first response data obtained by processing a first speech input corresponding to a first utterance received from the first electronic;
    identifying a second electronic device configured to detect a second utterance associated with the first response data within a designated time after the first utterance;
    transmitting a wake-up signal to the second electronic device;
    receiving, from the second electronic device, a speech input corresponding to an utterance obtained by a microphone turned on based on the wake-up signal;
    identifying whether the received speech input corresponding to the utterance is a second speech input corresponding to the second utterance;
    obtaining second response data obtained by processing the second speech input based on the first speech input and the first response data in response to identifying that the received speech input corresponding to the utterance is the second speech input corresponding to the second utterance; and
    transmitting the second response data to at least one of the first electronic device or the second electronic device through the communication module.

11. The method of claim 10, wherein the second electronic device is identified from among a plurality of electronic devices associated with a user.

12. The method of claim 11, further comprising converting the first speech input into first text data, identifying a first command corresponding to the first speech input by processing the first text data, and obtaining the first response data corresponding to a first plan for performing a first task associated with an execution of the first command.

13. The method of claim 11, wherein a wearable electronic device worn by the user of the first utterance among the plurality of electronic devices is identified as the second electronic device.

14. The method of claim 11, wherein an electronic device within a designated distance from the user of the first utterance among the plurality of electronic devices is identified as the second electronic device.

15. The method of claim 11, further comprising transmitting wake-up signals to the plurality of electronic devices respectively, receiving a plurality of user utterances detected by each of the plurality of electronic devices from a microphone turned on based on the wake-up signals, and identifying the second electronic device among the plurality of electronic devices based on comparing the plurality of utterances.

16. The method of claim 11, wherein the speech input corresponding to the utterance is identified as the second speech input corresponding to the second utterance based on identifying that the speech input corresponding to the utterance received from the second electronic device includes a speech corresponding to an operation interruption.

17. The method of claim 11, wherein the speech input corresponding to the utterance is identified as the second speech input corresponding to the second utterance based on identifying that the speech input corresponding to the utterance received from the second electronic device includes a speech included in the second response data for the first utterance.

18. The method of claim 11, wherein the speech input corresponding to the utterance is identified as the second speech input corresponding to the second utterance based on identifying that the speech input corresponding to the utterance received from the second electronic device includes a speech corresponding to a demonstrative pronoun.

19. A non-transitory computer readable storage medium having stored thereon instructions, the instructions when executed by at least one processor cause an electronic device to perform at least one operation, the at least one operation comprising:
    transmitting, to a first electronic device through a communication module, first response data obtained by processing a first speech input corresponding to a first utterance received from the first electronic device;
    identifying a second electronic device configured to detect a second utterance associated with the first response data within a designated time after the first utterance;
    transmitting a wake-up signal to the second electronic device;
    receiving, from the second electronic device, a speech input corresponding to an utterance obtained by a microphone turned on based on the wake-up signal;
    identifying whether the received speech input corresponding to the utterance is a second speech input corresponding to the second utterance;
    obtaining second response data obtained by processing the second speech input based on the first speech input and the first response data in response to identifying that the received speech input corresponding to the utterance is the second speech input corresponding to the second utterance; and
    transmitting the second response data to the first electronic device or the second electronic device through the communication module.

20. The non-transitory computer readable storage medium of claim 19, wherein the second electronic device is identified among a plurality of electronic devices associated with a user.

* * * * *